United States Patent
Stinson, III et al.

(10) Patent No.: US 9,167,289 B2
(45) Date of Patent: Oct. 20, 2015

(54) PERSPECTIVE DISPLAY SYSTEMS AND METHODS

(75) Inventors: Willis D. Stinson, III, Sherborn, MA (US); Rob C. Chang, Los Altos, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 150 days.

(21) Appl. No.: 12/874,862

(22) Filed: Sep. 2, 2010

(65) Prior Publication Data

US 2012/0060177 A1   Mar. 8, 2012

(51) Int. Cl.
 H04N 21/44 (2011.01)
 H04N 21/4223 (2011.01)
 H04N 13/00 (2006.01)
 G06F 3/01 (2006.01)
 H04N 13/02 (2006.01)
 H04N 21/442 (2011.01)

(52) U.S. Cl.
 CPC ............ *H04N 21/4223* (2013.01); *G06F 3/011* (2013.01); *G06F 3/012* (2013.01); *H04N 13/0011* (2013.01); *H04N 13/0014* (2013.01); *H04N 13/0278* (2013.01); *H04N 21/44* (2013.01); *H04N 21/44218* (2013.01)

(58) Field of Classification Search
 CPC ..... G06F 3/012; G06F 3/011; H04N 13/0011; H04N 13/0014; H04N 13/0278; H04N 21/44218
 See application file for complete search history.

(56) References Cited

U.S. PATENT DOCUMENTS

| | | |
|---|---|---|
| 5,107,443 A | 4/1992 | Smith et al. |
| 5,239,373 A | 8/1993 | Tang et al. |
| 5,381,158 A | 1/1995 | Takahara et al. |
| 5,426,879 A * | 6/1995 | Hecker ........................... 40/427 |
| 5,442,788 A | 8/1995 | Bier |
| 5,534,917 A | 7/1996 | MacDougall |
| 5,561,811 A | 10/1996 | Bier |
| 5,594,469 A | 1/1997 | Freeman et al. |
| 5,677,700 A | 10/1997 | Schwalba et al. |
| 5,732,227 A | 3/1998 | Kuzunuki et al. |
| 5,767,842 A | 6/1998 | Korth |
| 5,917,490 A | 6/1999 | Kuzunuki et al. |
| 6,008,800 A | 12/1999 | Pryor |

(Continued)

OTHER PUBLICATIONS

Gettys, J. "SNAP Computing and the X Window System". *Proceedings of the Linux Symposium*, vol. 1. Jul. 20-23, 2005. Ottawa, Canada.

(Continued)

*Primary Examiner* — Robert Hance

(57) ABSTRACT

Exemplary perspective display systems and methods are disclosed herein. An exemplary method includes a perspective display system acquiring visual data representative of a camera view of a user space associated with a display screen, determining, based on the visual data, a position of a user within the user space, identifying, based on the position of the user, a viewable region of an image, and displaying, on the display screen, the viewable region of the image, the displayed viewable region of the image representing a perspective view of the image based on the position of the user. In certain examples, the method further includes the perspective display system detecting a movement of the user to another position within the user space and updating the display on the display screen in real time in accordance with the movement to display another viewable region of the image on the display screen.

23 Claims, 15 Drawing Sheets

(56) References Cited

U.S. PATENT DOCUMENTS

| | | |
|---|---|---|
| 6,043,837 A * | 3/2000 | Driscoll et al. .................. 348/36 |
| 6,128,003 A | 10/2000 | Smith et al. |
| 6,191,773 B1 | 2/2001 | Maruno et al. |
| 6,266,057 B1 | 7/2001 | Kuzunuki et al. |
| 6,417,841 B1 | 7/2002 | Doi et al. |
| 6,498,628 B2 | 12/2002 | Iwamura |
| 6,498,970 B2 | 12/2002 | Colmenarez et al. |
| 6,501,515 B1 | 12/2002 | Iwamura |
| 6,594,616 B2 | 7/2003 | Zhang et al. |
| 6,624,833 B1 | 9/2003 | Kumar et al. |
| 6,720,949 B1 | 4/2004 | Pryor et al. |
| 6,788,809 B1 | 9/2004 | Grzeszczuk et al. |
| 6,867,775 B2 * | 3/2005 | Buck et al. .................... 345/427 |
| 6,952,199 B2 | 10/2005 | Doi et al. |
| 6,996,460 B1 | 2/2006 | Krahnstoever et al. |
| 7,007,236 B2 | 2/2006 | Dempski et al. |
| 7,058,204 B2 | 6/2006 | Hildreth et al. |
| 7,134,080 B2 | 11/2006 | Kjeldsen et al. |
| 7,224,526 B2 * | 5/2007 | Putilin et al. .................. 359/462 |
| 7,227,526 B2 | 6/2007 | Hildreth et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,430,312 B2 | 9/2008 | Gu |
| 2001/0033344 A1 * | 10/2001 | Grein et al. ................... 348/794 |
| 2002/0036617 A1 | 3/2002 | Pryor |
| 2002/0054032 A1 * | 5/2002 | Aoki et al. .................... 345/204 |
| 2002/0186200 A1 | 12/2002 | Green |
| 2003/0032478 A1 | 2/2003 | Takahama et al. |
| 2004/0036717 A1 * | 2/2004 | Kjeldsen et al. .............. 345/730 |
| 2004/0063480 A1 | 4/2004 | Wang |
| 2004/0063481 A1 | 4/2004 | Wang |
| 2004/0125953 A1 * | 7/2004 | Cho et al. ...................... 380/203 |
| 2004/0155902 A1 | 8/2004 | Dempski et al. |
| 2004/0193413 A1 | 9/2004 | Wilson et al. |
| 2004/0227992 A1 * | 11/2004 | Putilin et al. .................. 359/462 |
| 2004/0239757 A1 * | 12/2004 | Alden ............................. 348/51 |
| 2005/0059488 A1 * | 3/2005 | Larsen et al. .................. 463/36 |
| 2005/0104850 A1 | 5/2005 | Hu et al. |
| 2005/0259035 A1 | 11/2005 | Iwaki et al. |
| 2006/0010400 A1 | 1/2006 | Dehlin et al. |
| 2006/0033713 A1 | 2/2006 | Pryor |
| 2006/0044265 A1 | 3/2006 | Min |
| 2008/0088624 A1 * | 4/2008 | Long et al. .................... 345/427 |
| 2008/0123182 A1 * | 5/2008 | Cernasov ...................... 359/359 |
| 2009/0051699 A1 * | 2/2009 | Posa et al. ..................... 345/619 |
| 2009/0324008 A1 * | 12/2009 | Kongqiao et al. ............. 382/103 |
| 2010/0110069 A1 * | 5/2010 | Yuan .............................. 345/419 |
| 2010/0157063 A1 * | 6/2010 | Basso et al. ................... 348/169 |
| 2010/0177171 A1 * | 7/2010 | Marcus et al. ................. 348/53 |
| 2010/0235871 A1 * | 9/2010 | Kossin et al. ................. 725/105 |
| 2010/0281437 A1 * | 11/2010 | Stone-Perez et al. ......... 715/863 |
| 2010/0309381 A1 * | 12/2010 | Nakagawa et al. ........... 348/705 |
| 2011/0267437 A1 * | 11/2011 | Abeloe ........................... 348/51 |
| 2011/0289456 A1 * | 11/2011 | Reville et al. ................. 715/830 |

OTHER PUBLICATIONS

Gesturetek, GestPoint, 1 page, http://www.gesturetek.com/gestpoint/holopttrackingfrm.php, as accessed on Apr. 22, 2010.

Gesturetek, Gesturetek Tradeshow Demo, 1 page, http://www.youtube.com/watch?v=BrvtvfM-WCw, as accessed on Apr. 22, 2010.

EON, Touch Light, 1 page, http://www.youtube.com/watch?v=DTMLdjVoLQw, as accessed on Apr. 22, 2010.

Atlas Gloves, Atlas Gloves Demo, 1 page, http://atlasgloves.org/demo, as accessed on Apr. 22, 2010.

Oblong Industries, G-Speak, 1 pages, http://www.youtube.com/watch?v=dyMVZqJk8s4, as accessed on Apr. 22, 2010.

Jeff Han, Multi-Touch Sensing, 1 page, http://www.youtube.com/watch?v=zwGAKUForhM, as accessed on Apr. 22, 2010.

Toshiba, Gesture Interface Demo, 1 page, http://www.youtube.com/watch?v=RL9MpXhWCrQ, as accessed on Apr. 22, 2010.

Engadget, Winscape Virtual Window, 1 page, http://www.engadget.com/2010/04/15/winscape-virtual-window-features-wiimote-headtracking-absolutel/, as accessed on Apr. 30, 2010.

Engadget, Headtracking, 1 page, http://www.engadget.com/2007/12/21/diy-head-tracker-takes-wiimote-hacking-to-dizzying-new-heights/, as accessed on Aug. 4, 2010.

Rationalcraft, Winscape, 3 pages, http://rationalcraft.com/Winscape.html, as accessed on Aug. 6, 2010.

* cited by examiner

PERSPECTIVE DISPLAY SYSTEMS AND METHODS

BACKGROUND INFORMATION

As computer system technologies have advanced, so too have user interface technologies that allow users to interact with computer systems. For example, increasingly large and complex display screens capable of displaying output (e.g., graphical user interfaces, media content, etc.) provided by computer systems have become available to consumers. In addition, a large variety of technologies for receiving user input have been developed. Such user interface technologies are typically designed to produce quality experiences for users who view content provided by computer systems or otherwise interact with computer systems.

To illustrate, although many conventional display technologies display content in accordance with predefined settings without taking any external factors into account, other display technologies are configured to modify a display of content based on an external factor such as a position of a device held by or otherwise attached to a viewer. With such display technologies, when the viewer moves the device, the content of the display may be modified accordingly.

However, there remains room to improve such display technologies to produce higher quality user experiences such as by more effectively determining the position of a viewer and/or modifying the display of content based on the position of the viewer. In addition, there remains room to produce higher quality user experiences by providing more content that is conducive to and/or desirable for dynamic display based on the position of the viewer.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary perspective display systems and methods are disclosed herein. As described in more detail below, one or more of the exemplary systems and methods disclosed herein may dynamically identify and display a viewable region of an image on a display screen based on a position of a user within a user space associated with the display screen. The viewable region may be dynamic in that the viewable region displayed on the display screen may be updated in real time in accordance with movement of the user within the user space. Accordingly, the display on the display screen may function as a "virtual window" that facilitates a user perception of a perspective view of an image such as may be experienced by a user looking through an actual window to see a perspective view of an image on the other side of the window, which view is dependent on the position of the user relative to the window.

In certain embodiments, the perspective display systems and methods described herein may be implemented by exemplary video delivery and display systems and methods, examples of which are also described herein. Accordingly, a video image may be received, and a viewable region of the video image may be dynamically identified and displayed on a display screen for viewing by a user based on a position of the user within a physical user space associated within the display screen. In this manner, the display on the display screen may function as a virtual window that facilitates a user perception of a perspective view of the video image that changes dynamically in accordance with movement of the user within the user space. In some examples, the video image may include a live video image of a scene captured and provided by a video camera in real time. This may allow a user to experience a virtual window view of a scene captured at any geographic location at which the video camera is configured to capture live video content.

Figure 1:
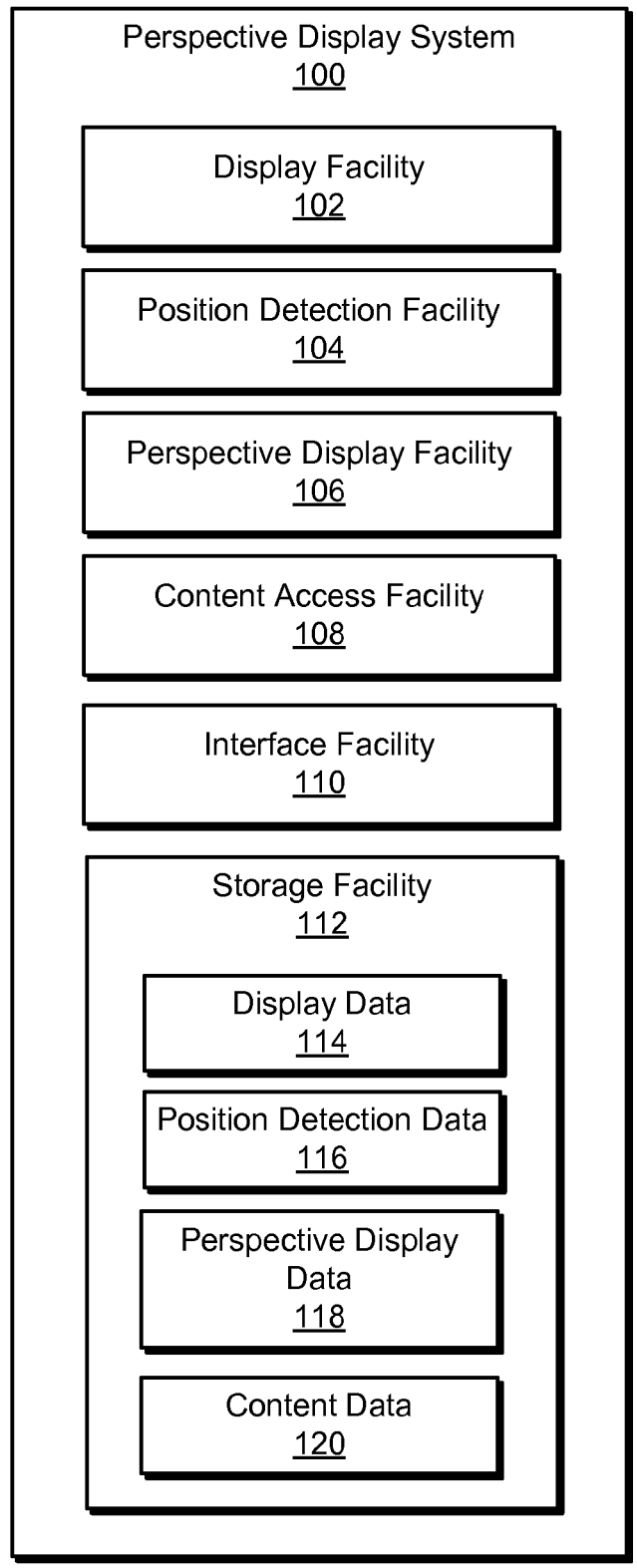
FIG. 1 illustrates an exemplary perspective display system according to principles described herein.

FIG. 1 illustrates an exemplary perspective display system 100 (or simply "system 100"). System 100 may include, but is not limited to, a display facility 102, a position detection facility 104, a perspective display facility 106, a content access facility 108, an interface facility 110, and a storage facility 112, which may be communicatively coupled to one another using any suitable technologies.

Display facility 102 may include a display device configured to provide a display on a display screen of the display device for viewing by a user. The display device may include, without limitation, a wall-mounted display device, television, computer monitor, video game display device, or other display device having a display screen on which a display may be presented for viewing by one or more users. A display may include any combination and/or layout of display content, which may include video content presented in the display, one or more graphical assets (e.g., frames, windows, cursors, and other graphical objects) presented in the display, application content presented in the display, media content presented in the display, video game content presented in the display, and/or any other content presented in the display.

Display facility 102 may include any hardware, firmware, and/or software configured to facilitate a display of content on a display screen for viewing by one or more users. For example, display facility 102 may include a display device, display screen, display driver(s), graphics engine, and/or other components configured to provide and/or control a display on a display screen. In certain embodiments, display facility 102 may include one or more components of a computing device such as a set-top box, game console, tablet computer, or personal computer that are configured to generate and provide data representative of display content to a display device such as a television (e.g., a flat screen television), computer monitor, or tablet computer display for display on a display screen of the display device.

Position detection facility 104 may be configured to perform any of the position detection operations described herein, including detecting a position of one or more users in a physical user space associated with a display screen. Position detection facility 104 may be able to detect a position of a user in any suitable way, including, for example, by employing two-dimensional and/or three-dimensional spatial sensing technologies capable of acquiring spatial data representative of the physical user space associated with the display screen. For instance, position detection facility 104 may include a single video camera configured for two-dimensional visual sensing (e.g., a single Charge-Coupled Device ("CCD") or CMOS-sensor camera configured for two-dimensional visual sensing), a single stereo vision video camera configured for three-dimensional visual sensing, an array of video cameras configured for high-fidelity three-dimensional visual sensing, and any combination or sub-combination thereof positioned relative to a display screen so as to monitor the physical user space associated with the display screen and acquire visual image data (e.g., video camera data) representative of a visual camera view of the physical user space. When a single two-dimensional video camera is used for three-dimensional sensing, a depth (e.g., a distance away from a display screen) may be estimated in any suitable way, such as by using camera image data to measure a distance between a user's eyes and compute a depth based on the measured distance between the user's eyes. Position detection facility 104 may also be configured to compensate for a position of a camera relative to a display screen when determining the position of a user in the physical user space. In certain embodiments, wide-angle video cameras may be used to maximize the physical user space that is visually monitored.

Position detection facility 104 may be configured to determine, based on the acquired spatial data (e.g., visual image data), a position of a user in the physical user space. For example, position detection facility 104 may be configured to analyze the spatial data to identify a physical feature of the user (e.g., the head of the user, the face of the user, one or both eyes of the user, etc.) and determine a position of the physical feature of the user in the physical user space. In certain examples, the position may be a three-dimensional position within the physical user space. The three-dimensional position may be represented in terms of three-dimensional coordinate axes coordinates (e.g., (x, y, z) coordinates) or in any other suitable way.

In certain embodiments, position detection facility 104 may be configured to detect (e.g., visually detect) a position of a user without the user having to hold, be attached to, or otherwise utilize a user input device within the physical user space. For example, position detection facility 104 may be configured to identify and track a physical feature of the user within the physical user space to determine the position of the user. In certain implementations, once position detection facility 104 identifies the physical feature of the user, position detection facility 104 may lock onto and continually track the physical feature of the user within the physical user space. In this or another suitable manner, position detection facility 104 may detect movement of the user within the physical user space, such as movement of a physical feature of the user from one position to another in the physical user space.

In certain embodiments, position detection facility 104 may be configured to detect a predefined tracking initiation gesture performed by a user within the physical user space. In response to the detection of the predefined tracking initiation gesture, position detection facility 104 may identify, lock onto, and continually track a physical feature of the user in the physical user space. In certain embodiments, position detection facility 104 may be further configured to detect a predefined tracking termination gesture performed by the user within the physical user space. In response to the detection of the predefined tracking termination gesture, position detection facility 104 may stop tracking the physical feature of the user in the physical user space. Such locking and tracking of user position in the physical user space may support position detection facility 104 concurrently detecting positions of multiple users within the physical user space.

Position detection facility 104 may be configured to detect any suitable predefined gestures performed by a user in the physical user space. For example, the user may wave a hand to instruct system 100 to begin or terminate tracking of the position of the user in the physical user space.

Perspective display facility 106 may be configured to perform any of the perspective display operations described herein, including receiving data representative of a position of a user within the physical user space from position detection facility 104 and identifying a viewable region of an image (e.g., a viewable region of a still image or a video image such as a real-time live video image carried by a video feed) to be displayed based on the given position of the user. Perspective display facility 106 may provide data representative of the identified viewable region of the image to display facility 102 for display on a display screen. The displayed viewable region of the image may represent a perspective view of the image as would be viewed by the user looking at the image through an aperture defined by the display screen. Accordingly, the perspective view that is displayed is dependent on the position of the user in the physical user space relative to the display screen.

Perspective display facility 106 may be configured to facilitate dynamic updating of the viewable region of the image displayed on the display screen based on movement of the user in the physical user space. For example, when data representative of the position of the user indicates that the position of the user has changed (as compared to the most recent previous position of the user), perspective display facility 106 may utilize the data representative of the new position of the user to identify another viewable region of the image to be displayed based on the new position of the user. For example, perspective display facility 106 may identify another viewable region of the image based on the new position of the user and provide data representative of the other viewable region of the image to display facility 102 for display on the display screen. In response, display facility 102 may update the display on the display screen from displaying the first viewable region of the image to displaying the second viewable region of the image. In certain examples, the updating of the display may include displaying at least one of panning, tilting, and zooming from the first viewable region of the image to the second viewable region of the image in real time. Examples of identifying and displaying a viewable region of an image on a display screen based on user position are described further below.

Content access facility 108 may be configured to access content that may be displayed by display facility 102. Content access facility 108 may be configured to access any suitable display content from any suitable source, including a local or remote content source. In certain embodiments, content access facility 108 may be configured to access video content such as a real-time live video image carried by a video feed received from a video capture and/or distribution subsystem, which is described in more detail below. Content access facility 108 may employ any suitable content access technologies to access content for display.

Interface facility 110 may be configured to provide one or more interfaces between display facility 102, position detection facility 104, perspective display facility 106, content access facility 108, storage facility 112, and any computing hardware, firmware, and/or software associated with system 100. For example, interface facility 110 may provide an interface by which display facility 102, position detection facility 104, and/or perspective display facility 106 may communicate with an operating system and/or display content managers (e.g., application and/or media content managers) of a computing device. Additionally or alternatively, interface facility 110 may provide an interface by which display facility 102, position detection facility 104, and/or perspective display facility 106 may interface with content access facility 108. Interface facility 110 may include and/or employ any suitable technologies to provide such interfaces.

Storage facility 112 may store electronic data maintained and/or accessible by display facility 102, position detection facility 104, perspective display facility 106, content access facility 108, and/or interface facility 110. For example, storage facility 112 may store display data 114 representative of content displayed or to be displayed on a display screen, position detection data 116 used by and/or generated by position detection facility 104 in relation to detection of one or more positions of one or more users in a physical user space associated with a display screen (e.g., data representative of a detected position of a user), perspective display data 118 used by and/or generated by perspective display facility 106 in relation to identifying and/or displaying a viewable region of an image (e.g., data representative of an identified viewable region of an image), and content data 120 representative of content accessed by content access facility 108 (e.g., data representative of an image).

Figure 2:
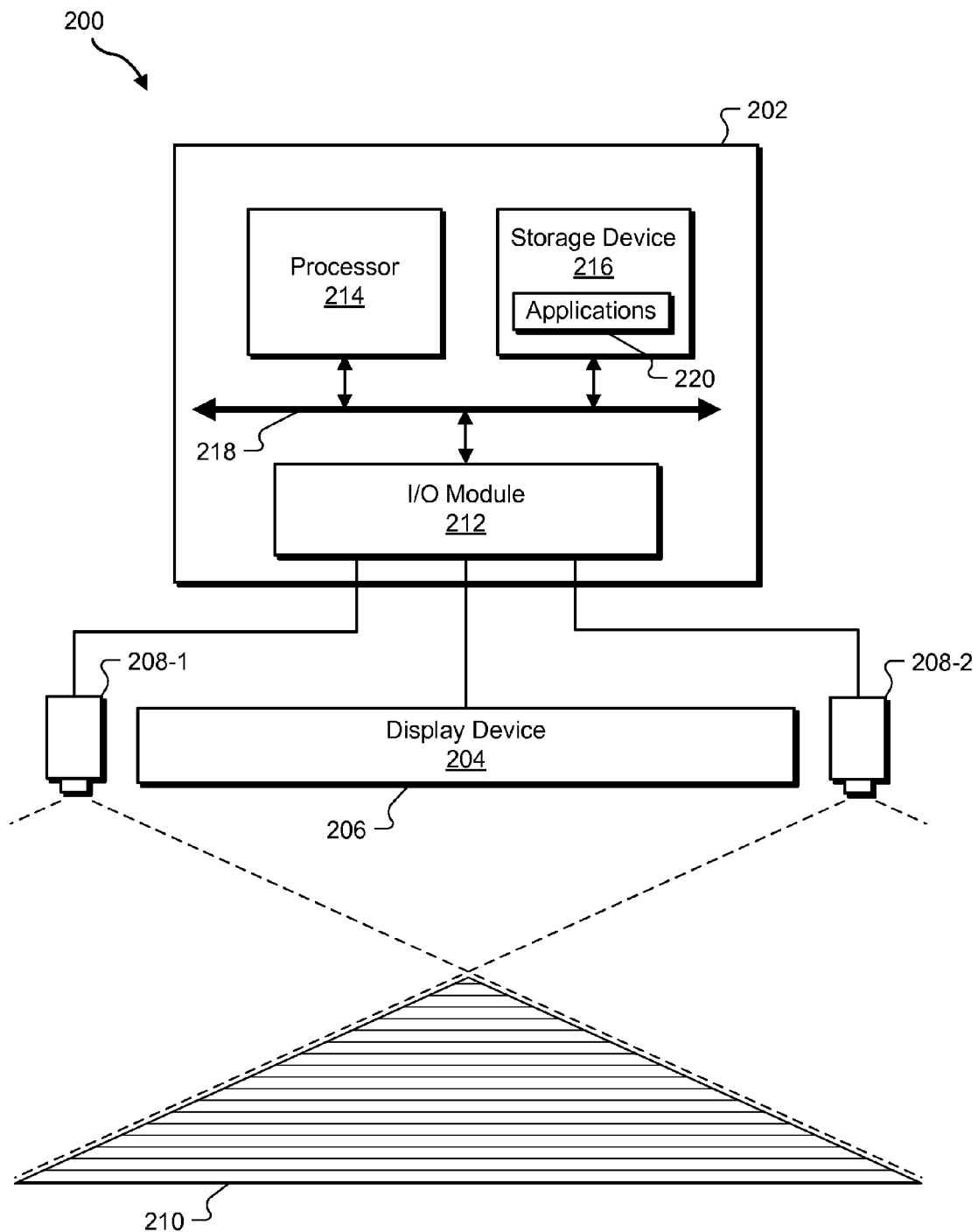
FIG. 2 illustrates a view of an exemplary implementation of the system of FIG. 1 according to principles described herein.

FIG. 2 illustrates a view of an exemplary implementation 200 of system 100 in which a computing device 202 may be communicatively coupled to and configured to drive a display device 204 by providing one or more signals that may be utilized by display device 204 to generate and provide a display on a display screen 206 of display device 204. Computing device 202 may also be communicatively coupled to and configured to receive input signals from a set of sensing devices 208 (e.g., sensing devices 208-1 and 208-2) that are strategically positioned relative to display screen 206 (e.g., a certain distance from either side of display device 204). Each sensing device 208 may be configured to sense spatial input provided within a sensing space. A sensing space associated with each sensing device 208 is delineated by dashed lines extending away from each sensing device 208 in FIG. 2. An intersection of the sensing spaces associated with sensing devices 208 may form an overall sensing space 210 for the set of sensing devices 208. In FIG. 2, the overall sensing space 210 is depicted by a pattern of horizontal lines within an area of intersection of the sensing spaces of sensing devices 208-1 and 208-2. In a two-camera implementation, overall sensing space 210 represents a physical space in which three-dimensional sensing may be performed, FIG. 2 shows a top view of the overall sensing space 210, which may be a three-dimensional space positioned in front of the display screen 206 of display device 204. Sensing devices 208 may be positioned such that the overall sensing space 210 includes and/or coincides with a physical user space typically occupied by one or more users when viewing the display screen 206 of display device 204. In certain embodiments, sensing devices 208 may be physically integrated within display device 204. In other embodiments, sensing devices 208 may be physically separate from display device 204.

In certain embodiments, sensing devices 208 may include a set of video cameras. Each camera in the set of cameras may be configured to capture video frame images within a field of view of the camera. In such embodiments, a field of view associated with each camera is delineated by dashed lines extending from each camera in FIG. 2. An intersection of the views associated with the cameras may form an overall field of view for the set of cameras. In FIG. 2, the overall field of view is equivalent to overall sensing space 210.

While FIG. 2 illustrates a two-sensor (e.g., a two-camera) sensing configuration that allows for three-dimensional sensing, this is illustrative only. Other configurations may be used in other embodiments. For example, a single-sensor (e.g., a single-camera) configuration may be employed and used for two-dimensional.

Display device 204 may include any device configured to provide a display on display screen 206. In certain implementations, display device 204 and/or display screen 206 may be disposed (e.g., mounted or projected) on a wall of a structure to help create an illusion of an actual window view. A border may be disposed on the wall around the display screen 206 to further enhance the illusion of an actual window view.

Computing device 202 may include any device configured to drive display device 204 and update a display shown on display screen 206 of display device 204 based on a position of a user. In certain embodiments, computing device 202 may include a set-top box and display device 204 may include a television connected to the set-top box. In other embodiments, computing device 202 may include a computer and display device 204 may include a monitor connected to the computer. In yet other embodiments, computing device 202 may include a gaming console and display device 204 may include a television or other display device connected to the gaming console. In yet other embodiments, computing device 202 may include a mobile computing device such as a mobile phone, tablet computer, or mobile entertainment device having display device 204 integrated therein or otherwise connected to the mobile computing device.

Computing device 202 may include an input/output ("I/O") module 212, a processor 214, and a storage device 216 communicatively coupled one to another via a communication infrastructure 218. The components of computing device 202 may communicate with one another, including sending data to and receiving data from one another, using any suitable communication technologies. While exemplary components of computing device 202 are shown in FIG. 2, the components illustrated in FIG. 2 are not intended to be limiting. Additional or alternative components may be used in other embodiments. Components of the computing device 202 shown in FIG. 2 will now be described in additional detail.

I/O module 212 may be configured to transmit output signals and receive input signals to/from one or more other devices. For example, I/O module 212 may be configured to receive sensing data from sensing devices 208 (e.g., camera image data from cameras) and to output display signals to display device 204 for use by display device 204 to generate a display on display screen 206. I/O module 212 may include any suitable hardware, firmware, and/or software for transmitting output signals and receiving input signals to/from display device 204 and sensing devices 208. I/O module 212 may be connected to display device 204 and sensing devices 208 using any suitable technologies, such as IEEE 1394, DVI, HDMI, VGA, component video, Ethernet, USB, wireless, analog, digital, and/or other connections.

Processor 214 generally represents any type or form of processing unit capable of processing data or interpreting, executing, and/or directing execution of one or more of the instructions, processes, and/or operations described herein. Processor 214 may direct execution of operations in accordance with one or more applications 220 or other computer-executable instructions such as may be stored in storage device 216 or another computer-readable medium. As an example, processor 214 may be configured to process data, including processing sensing data received from sensing devices 208 (e.g., processing raw image data received from cameras).

Storage device 216 may include one or more data storage media, devices, or configurations and may employ any type, form, and combination of data storage media and/or device. For example, storage device 216 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 216. For example, data representative of one or more executable applications 220 configured to direct processor 214 to perform one or more of the operations described herein may be stored within storage device 216.

In some examples, display facility 102, position detection facility 104, perspective display facility 106, content access facility 108, interface facility 110, and/or storage facility 112 may be partially or fully implemented by or within one or more components of computing device 202. For example, one or more applications 220 residing within storage device 216 may be configured to direct processor 214 to perform one or more processes or functions associated with display facility 102, position detection facility 104, perspective display facility 106, and/or content access facility 108. Likewise, storage facility 112 may be implemented by or within storage device 216. For example, display data 114, position detection data 116, perspective display data 118, and/or content data 120 may be stored within storage device 216.

Accordingly, computing device 202 may detect a position of a user within overall sensing space 210, identify a viewable region of an image based on the position of the user, and direct display device 204 to display the identified viewable region of the image on display screen 206 such that the user may view the displayed viewable region of the image. The displayed viewable region may appear as a perspective view of the image to the user. When the user moves from one position to another within overall sensing space 210, computing device 202 may detect the movement of the user, identify another viewable region of the image based on the new position of the user, and direct display device 204 to display the other viewable region of the image on display screen 206 such that the user may view the other viewable region of the image.

A viewable region of an image may be identified for display in any suitable way. As used herein, the term "viewable region" refers to any region of an image that is identified for display on a display screen. The viewable region of the image may include a portion of the image or the entire image. The viewable region may be of various sizes depending on the position of the user. In certain examples, the viewable region is a shape (e.g., a rectangle) that corresponds to the shape of display screen 206. Examples of viewable regions of an image and identifying viewable regions of an image for display will now be described.

Figure 3:
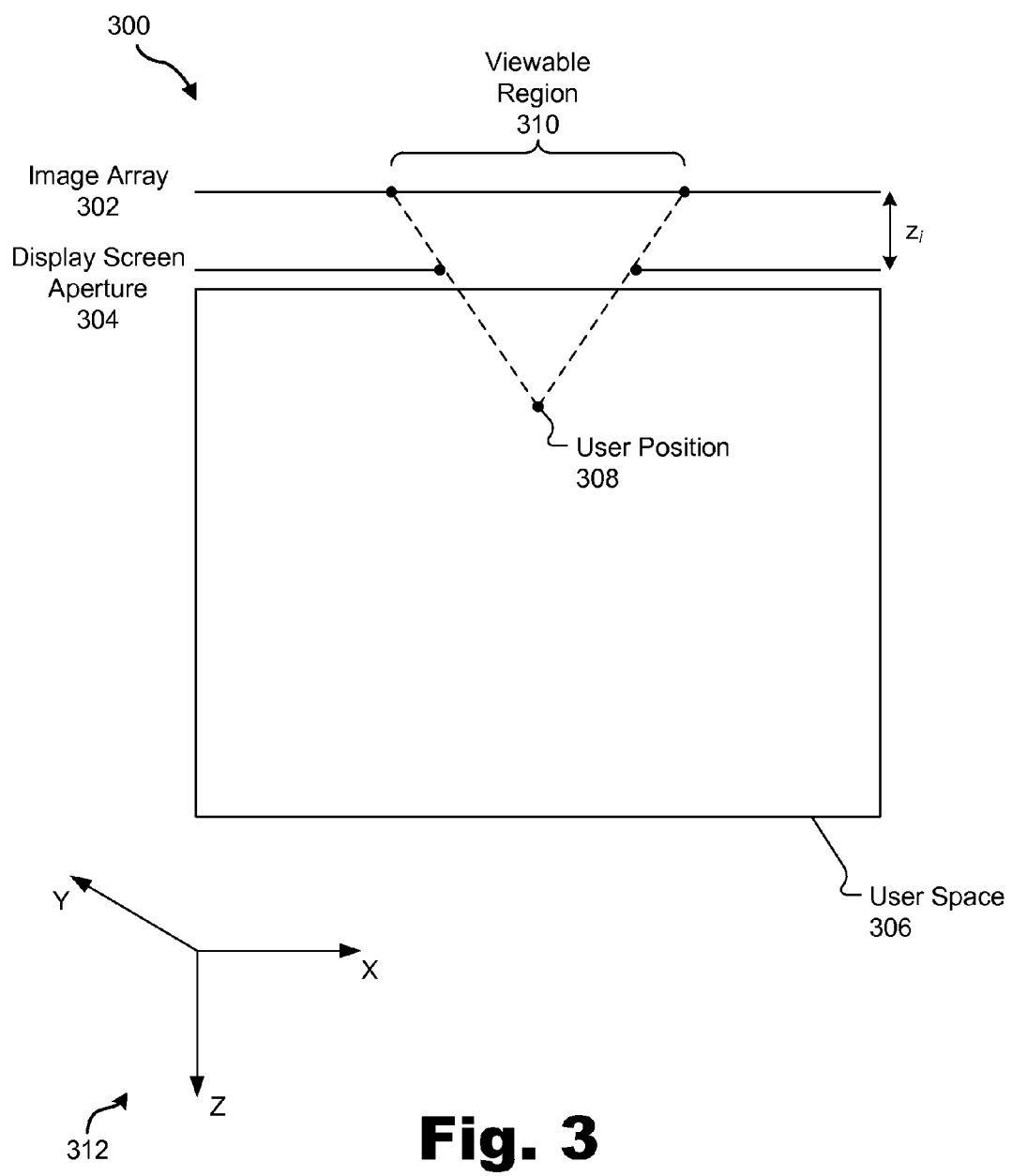
FIG. 3 illustrates a top view of an exemplary geometric model of an image array, a display screen aperture, and a physical user space according to principles described herein.

In certain examples, perspective display facility 106 may be configured to identify a viewable region of an image to be displayed using data representative of virtual geometric relationships between a display screen, an image array representative of the image, and a position of a user in a physical user space. To illustrate, FIG. 3 shows a top view of an exemplary geometric model 300 of an image array 302, a display screen aperture 304, and a physical user space 306. A display screen may be modeled as display screen aperture 304 that exposes a view of image array 302 that is virtually positioned a certain distance "$z_i$" behind the display screen. As shown, display screen aperture 304 may be positioned between image array 302 and user space 306 such that display screen aperture 304 may function as an aperture through which a user located in user space 306 may view at least a portion of image array 302 depending on the position of the user. The relationship between display screen aperture 304 and user space 306 in model 300 may represent an actual relationship of a display screen with a physical user space.

Perspective display facility 106 may maintain data representative of the relationship between display screen aperture 304 and user space 306, as well as data representative of a relationship of image array 302 with display screen aperture 304 (e.g., a distance "$z_i$" between image array 302 and display screen aperture 304) such that the data representative of the relationships can be used to identify, based on a position of a user in user space 306, what region of image array 302 would be visible to the user through display screen aperture 304. The identified viewable region may be displayed on the display screen to facilitate a user perception of looking through a virtual window to view the viewable region of image array 302. In FIG. 3, for example, a user position 308 marks a position of a user within user space 306. From user position 308 looking through display screen aperture 304, the user would see viewable region 310 of image array 302. Accordingly, viewable region 310 of image array 302 would be displayed on the display screen modeled as display screen aperture 304 to facilitate a user perception of looking through a virtual window to view viewable region 310 of image array 302.

As mentioned, in certain embodiments, the position of the user within the physical user space may be identified in terms of three-dimensional coordinates. To illustrate, FIG. 3 shows a three-dimensional coordinate axes system 312 having an "X axis" oriented parallel to display screen aperture 304, a "Z axis" oriented perpendicular to the x axis and display screen aperture 304, and a "Y axis" oriented perpendicular to both the X and Z axes. Accordingly, user position 308 may be represented in terms of (x, y, z) coordinates.

Using data representative of user position 308 and relationships between display screen aperture 304, image array 302, and user space 306, perspective display facility 106 may compute viewable region 310 of image array 302. For example, perspective display facility 106 may compute boundaries of viewable region 310. For instance, where viewable region 310 is rectangular in shape, perspective display facility 106 may use the X and Z coordinate values of user position 308 relative to display screen aperture 304 and image array 302 to compute left and right edges of viewable region 310, and the Y and Z coordinate values of user position 308 relative to display screen aperture 304 and image array 302 to compute top and bottom edges of viewable region 310.

Figure 4A:
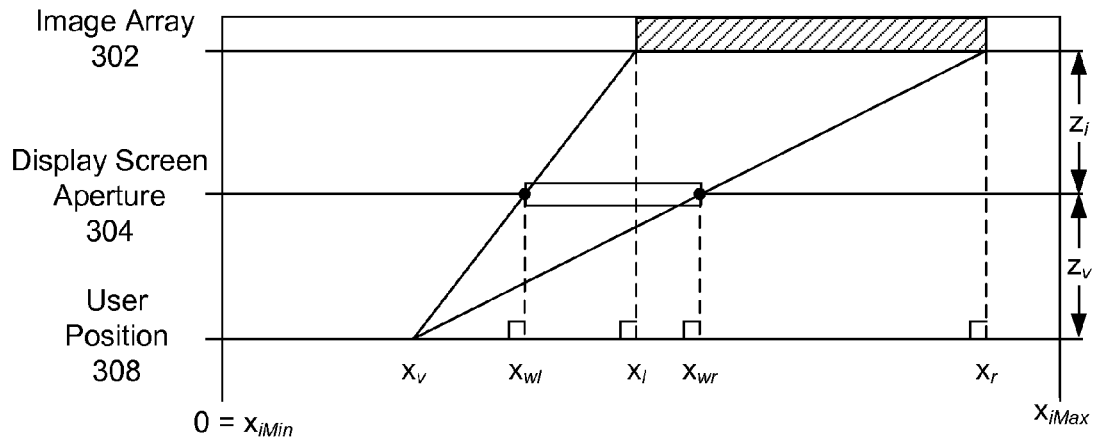
FIG. 4A illustrates a top view of the geometric model of FIG. 3 in which a user is located at a particular position in the physical user space according to principles described herein.
Figure 4B:
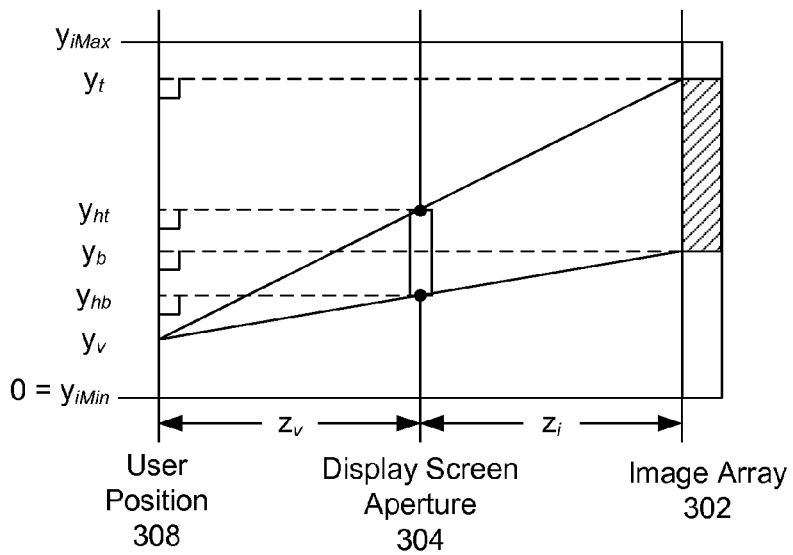
FIG. 4B illustrates a side view of the geometric model shown in FIG. 4A in which a user is located at a particular position in the physical user space according to principles described herein.

An example of computing a viewable region of image array 302 to be displayed will now be described in connection with FIGS. 4A-4B. FIG. 4A illustrates a top view of model 300 and FIG. 4B illustrates a side view of model 300 in which a user is located at a particular position $(x_v, y_v, z_v)$, in which $x_v$ represents the position of the user along the X axis, $y_v$ represents the position of the user along the Y axis, and $z_v$ represents the position of the user along the Z axis (i.e., the distance of the user from the display screen). As shown, $z_i$ represents a virtual distance of image array 302 behind display screen aperture 304, $x_{wl}$ represents the left width value of display screen aperture 304 (i.e., the left edge of the display screen), $x_{wr}$ represents the right width value of display screen aperture 304 (i.e., the right edge of the display screen), $y_{hb}$ represents the bottom height value of display screen aperture 304 (i.e., the bottom edge of the display screen), and $y_{ht}$ represents the top height value of display screen aperture 304 (i.e., the top edge of the display screen), $x_{iMin}$ represents the left width value of image array 302 (i.e., the left edge of image array 302), $x_{iMax}$ represents the right width value of image array 302 (i.e., the right edge of image array 302), $y_{iMin}$ represents the bottom height value of image array 302 (i.e., the bottom edge of image array 302), and $y_{iMax}$ represents the top height value of image array 302 (i.e., the top edge of image array 302). This information may be used by perspective display facility 106 to compute values for the left edge ($x_l$), right edge ($x_r$), bottom edge ($y_b$), and top edge ("$y_t$") using the following equations:

$$x_l = x_v + ((z_v + z_i)/z_v)(x_{wl} - x_v),$$

$$x_r = x_v + ((z_v + z_i)/z_v)(x_{wr} - x_v),$$

$$y_b = y_v + ((z_v + z_i)/z_v)(y_{hb} - y_v), \text{ and}$$

$$y_t = y_v + ((z_v + z_i)/z_v)(y_{ht} - y_v).$$

Each of these equations may be derived based on equations related to the congruency of triangles in geometric model 300. For example, the first equation for computing $x_l$ may be derived as follows:

$$(x_l - x_v)/(z_v + z_i) = (x_{wl} - x_v)/z_v \text{ (from congruence of triangles),}$$

$$x_l - x_v = ((z_v + z_i)/z_v)(x_{wl} - x_v), \text{ and}$$

$$x_l = x_v + ((z_v + z_i)/z_v)(x_{wl} - x_v).$$

Each of the other equations may be derived similarly.

Figure 5:
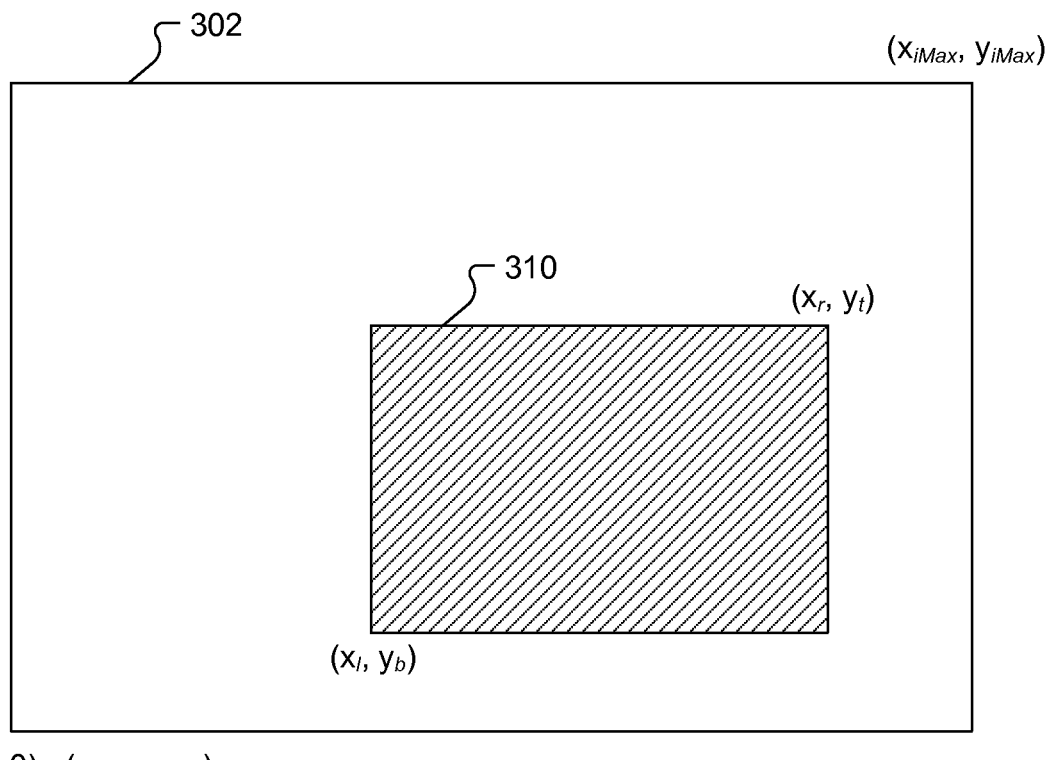
FIG. 5 illustrates a front view of an exemplary viewable region within an image array according to principles described herein.

From the values for $x_l$, $x_r$, $y_b$, and $y_t$, viewable region 310 may be determined using the values to define opposite corners of viewable region 310, such as ($x_l$, $y_b$) for the lower left corner and ($x_r$, $y_t$) for the upper right corner of viewable region 310. FIG. 5 illustrates a front view of an exemplary viewable region 310 that is a sub-rectangle defined by ($x_l$, $y_b$) for the lower left corner and ($x_r$, $y_t$) for the upper right corner and that is a portion of image array 302, which is a larger rectangle defined by ($x_{iMin}$, $y_{iMin}$) for the lower left corner and ($x_{iMax}$, $y_{iMax}$) for the upper right corner. Viewable region 310 may include a subset of pixels included in image array 302, which may include an overall set of pixels representative of a source image such as a still image or a video frame. In certain examples, image array 302 may be a camera array representative of an image captured by a camera (e.g., raw data representing pixels of a camera image).

Viewable region 310, such as that shown in FIG. 5, may be displayed on a display screen as described herein to facilitate a user perception of viewing a perspective view of image array 302 from user position 308 in user space 306. As user position 308 changes within user space 306, viewable region 310 may change accordingly. Hence, viewable region 310 may comprise a variable dimension region (e.g., a rectangle) that changes size and/or moves around on image array 302 in accordance with movement of user position 308 within user space 306. For example, when the distance increases between a user and the display screen, the size of viewable region 310 may decrease accordingly, when the distance decreases between the user and the display screen, the size of viewable region 310 may increase accordingly, when the user moves from left to right in front of the display screen, the viewable region 310 may move from right to left on image array 302, when the user moves from right to left in front of the display screen, the viewable region 310 may move from left to right on image array 302, when the user moves upward in front of the display screen, the viewable region 310 may move from downward on image array 302, and when the user moves downward in front of the display screen, the viewable region 310 may move upward on image array 302.

Figure 6:
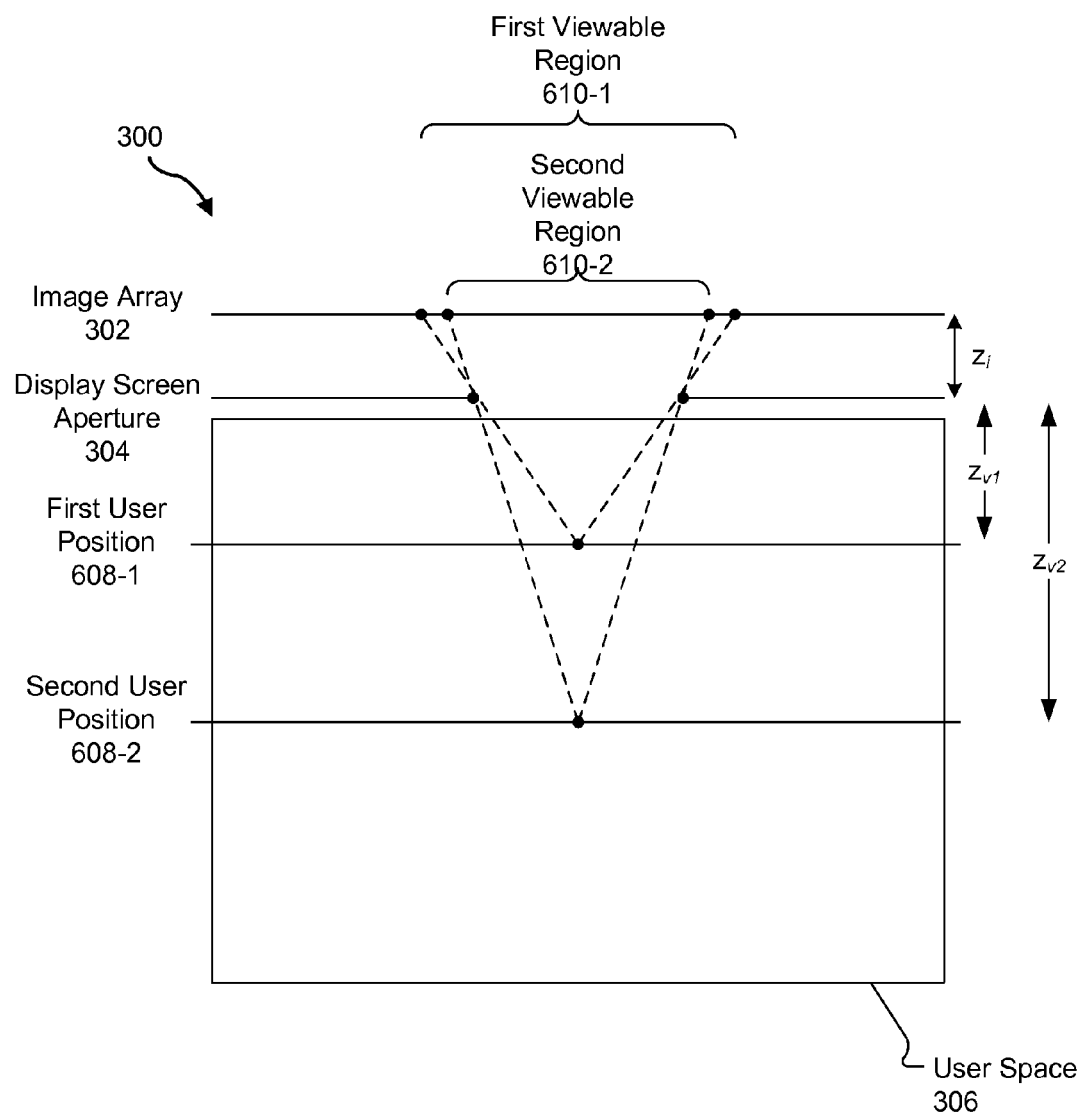
FIG. 6 shows a top view of two different user positions and corresponding viewable regions of an image array in the geometric model of FIG. 3 according to principles described herein.

To illustrate, FIG. 6 shows a top view of two different user positions and corresponding viewable regions of image array 302 in model 300. When a user is located at a first user position 608-1 within user space 306, which is a first distance ($z_{v1}$) from display screen aperture 304, perspective display facility 106 determines a first viewable region 610-1 to be viewable by the user through display screen aperture 304. Accordingly, first viewable region 610-1 will be displayed on a display screen while the user is located at first user position 608-1. When the user is located at a second user position 608-2 within user space 306, which is a second distance ($z_{v2}$) from display screen aperture 304, perspective display facility 106 determines a second viewable region 610-2 to be viewable by the user through display screen aperture 304. Accordingly, second viewable region 610-2 will be displayed on the display screen while the user is located at second user position 608-2. As shown in FIG. 6, the second distance $z_{v2}$ is greater than the first distance $z_{v1}$. Accordingly, the second viewable region 610-2 is smaller in size that the first viewable region 610-1. Hence, when the user moves from away from display screen aperture 304 from first user position 608-1 to second user position 608-2, the appearance on the display screen represents a zooming out from image array 302. The viewable region on the display may be dynamically changed as the user moves from first user position 608-1 to second user position 608-2 such that a dynamic zooming-out effect is displayed on the display screen.

While the example shown in FIG. 6 is directed to user movement along the Z axis, similarly, as the user moves side-to-side along the X axis and/or up or down along the Y axis within user space 306, the viewable region of image array 302 may change by sliding horizontally and/or vertically on image array 302. As the viewable region slides horizontally and/or vertically along image array 302, a dynamic panning and/or tilting effect may be displayed on the display screen. Panning, tilting, and/or zooming effects may be displayed separately or in combination on the display screen as the viewable region of image array 302 changes in accordance with user movement within user space 306.

Figure 7:
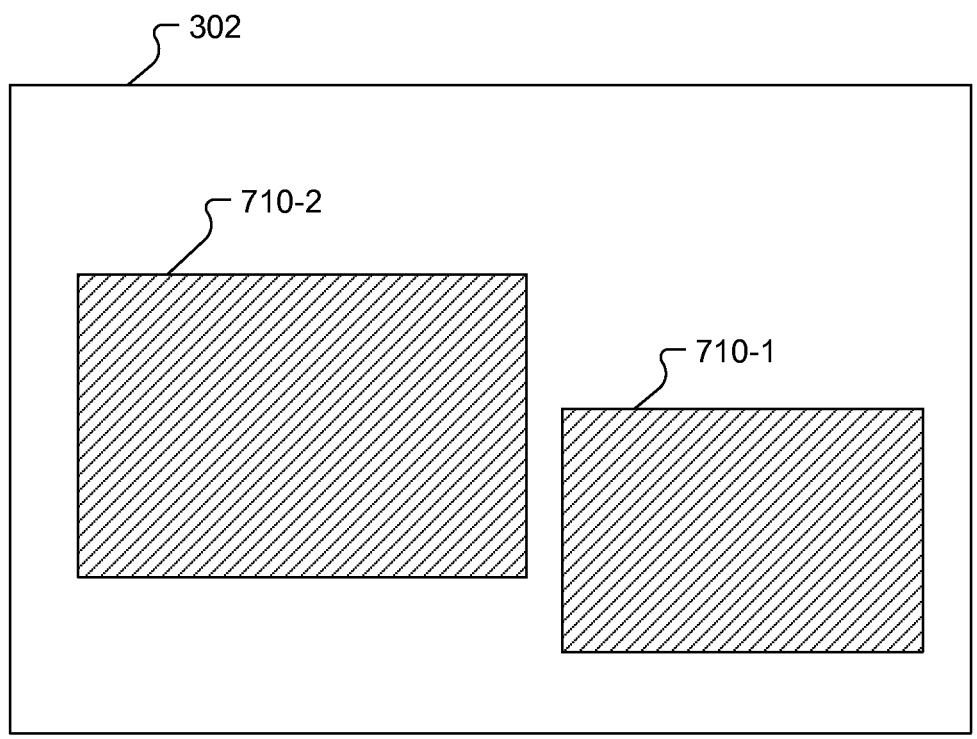
FIG. 7 illustrates a front view of two different exemplary viewable regions within an image array according to principles described herein.

FIG. 7 illustrates a front view of two different viewable regions of image array 302. A first viewable region 710-1 may be identified by perspective display facility 106 for display on a display screen when a user is located at a first user position, and a second viewable region 710-2 may be identified by perspective display facility 106 for display on the display screen when the user is located at a second user position. The change from displaying first viewable region 710-1 to displaying second viewable region 710-2 may include modifying the size of viewable region 710-2 and sliding the viewable region 710-1 horizontally and vertically to another location of image array 302. The change from displaying the first viewable region 710-1 to displaying the second viewable region 710-2 may be dynamically represented on the display screen to convey dynamic zooming, panning, and/or tilting effects.

In certain embodiments, perspective display facility 106 may be configured to calibrate model 300 for use in determining a viewable region of image array 302, such as by defining a size of image array 302 relative to a size of display screen aperture 304 and/or determining a value of the virtual distance $z_i$ between image array 302 and display screen aperture 304 to be used to compute a viewable region of image array 302 based on user position 308. Any number of constants may be predefined and used to calibrate model 300. For example, within user space 306 there is a maximum distance from display screen aperture 304 at which a user will be able to view the entire image array 302 through display screen aperture 304. This maximum distance may be predefined as may suit a particular implementation. Perspective display facility 106 may compute and set a value for the virtual distance $z_i$ between image array 302 and display screen aperture 304 as the distance at which a user located at the maximum distance from display screen aperture 304 (and centered relative to display screen aperture 304) is able to view the entire image array 302.

In certain embodiments, perspective display system 100 may be configured to concurrently provide multiple different perspective views of an image on a display screen. For example, multiple users may be located within a physical user space, and perspective display facility 106 may be configured to concurrently track the positions of the users within the physical user space. This may be performed in any suitable way. For example, perspective display facility 106 may detect a predefined tracking initiation gesture performed by each of the users in the physical user space, lock onto a physical feature of each user in response to the gesture, and track the position of the physical feature of each user in the physical user space.

In addition, display facility 102 may be configured to concurrently provide multiple different views of an image. For example, display facility 102 may be configured with a directional pixel display screen capable of projecting different images in various directions. Accordingly, a user positioned a first direction from the display screen may be able to view a first perspective image (e.g., a first viewable region of an image) on the display screen, and a user positioned a second direction from the display screen may be able to view a second perspective image (e.g., a second viewable region of an image) on the display screen. Other directional image projection technologies may be used in other implementations.

In certain embodiments, perspective display system 100 may be configured to focus on a position of a particular user even when multiple users are located within the physical user space. For example, perspective display facility 106 may be configured to detect a predefined tracking initiation gesture performed by a user, lock onto the user, and track the position of the user within the physical user space. The positions of other users in the physical user space will not be tracked by perspective display facility 106 while perspective display facility 106 is locked onto the particular user. The user being tracked may change from one user to another user by perspective display facility 106 detecting a predefined tracking termination gesture performed by the user being tracked followed by a predefined tracking initiation gesture performed by another user.

Figure 8:
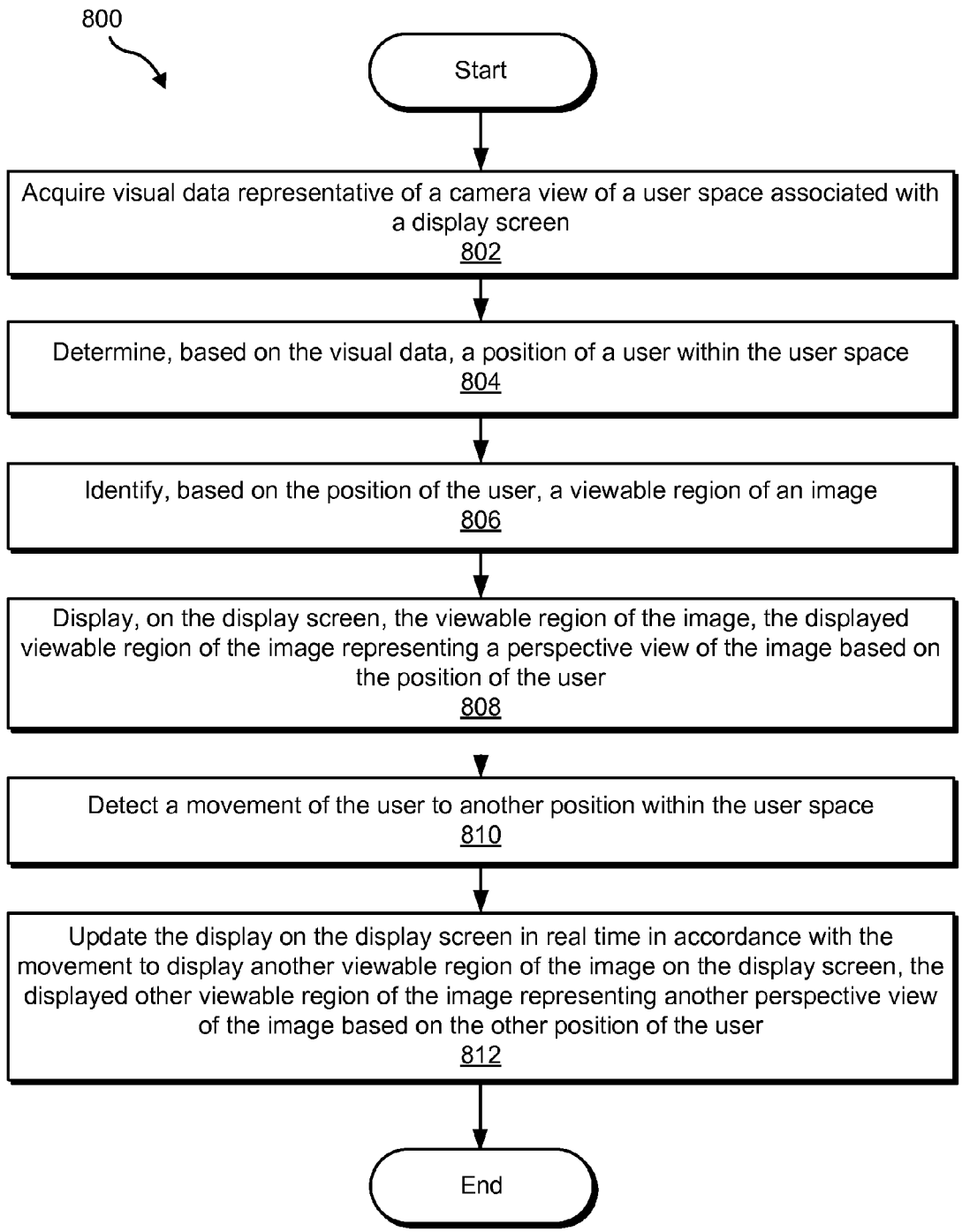
FIG. 8 illustrates an exemplary perspective display method according to principles described herein.

FIG. 8 illustrates an exemplary perspective display method 800 according to principles described herein. While FIG. 8 illustrates exemplary steps according to one embodiment, other embodiments may omit, add to, reorder, combine, and/or modify any of the steps shown in FIG. 8. In certain embodiments, one or more of the steps shown in FIG. 8 may be performed by one or more components of system 100.

In step 802, visual data representative of a camera view of a user space associated with a display screen may be acquired. Step 802 may be performed in any of the ways described herein.

In step 804, a position of a user within the user space may be determined based on the visual data. Step 804 may be performed in any of the ways described herein, including by analyzing the visual data to identify a physical feature of a user and the position of the physical feature of the user within the user space. As mentioned, the position of the user may be determined without the user having to utilize a user input device within the user space.

In step 806, a viewable region of an image may be identified based on the position of the user. Step 806 may be performed in any of the ways described herein. For example, based on the position of the user determined in step 804, perspective display facility 106 may identify a viewable region of an image as described herein.

In step 808, the viewable region of the image identified in step 806 may be displayed on the display screen. Step 808 may be performed in any of the ways described herein. The displayed viewable region of the image may represent a perspective view of the image that is made viewable based on the position of the user, as described herein.

In step 810, a movement of the user to another position within the user space may be detected. Step 810 may be performed in any of the ways described herein, including by acquiring and analyzing new visual data representative of a more recent camera view of the user space to identify the physical feature of a user and the position of the physical feature of the user within the user space.

In step 812, the display on the display screen may be updated in real time in accordance with the movement of the user detected in step 810 to display another viewable region of the image on the display screen. The other viewable region of the image displayed on this display screen may represent another perspective view of the image that is made viewable based on the other position of the user within the user space.

As mentioned, image array 302 may represent an image of which one or more perspective views may be dynamically displayed based on a position of user within a user space. In certain examples, the image may be of a panoramic scene or view having a long focal length. The image may be two-dimensional or three-dimensional. The image may represent any scene or view, including a live video image of a scene or view captured and provided in real time by one or more video cameras. To this end, the exemplary perspective display systems and methods described herein may be implemented by one or more video delivery and display systems and methods to provide dynamic perspective displays of a video image, including a live video image carried by a real-time video feed.

Figure 9:
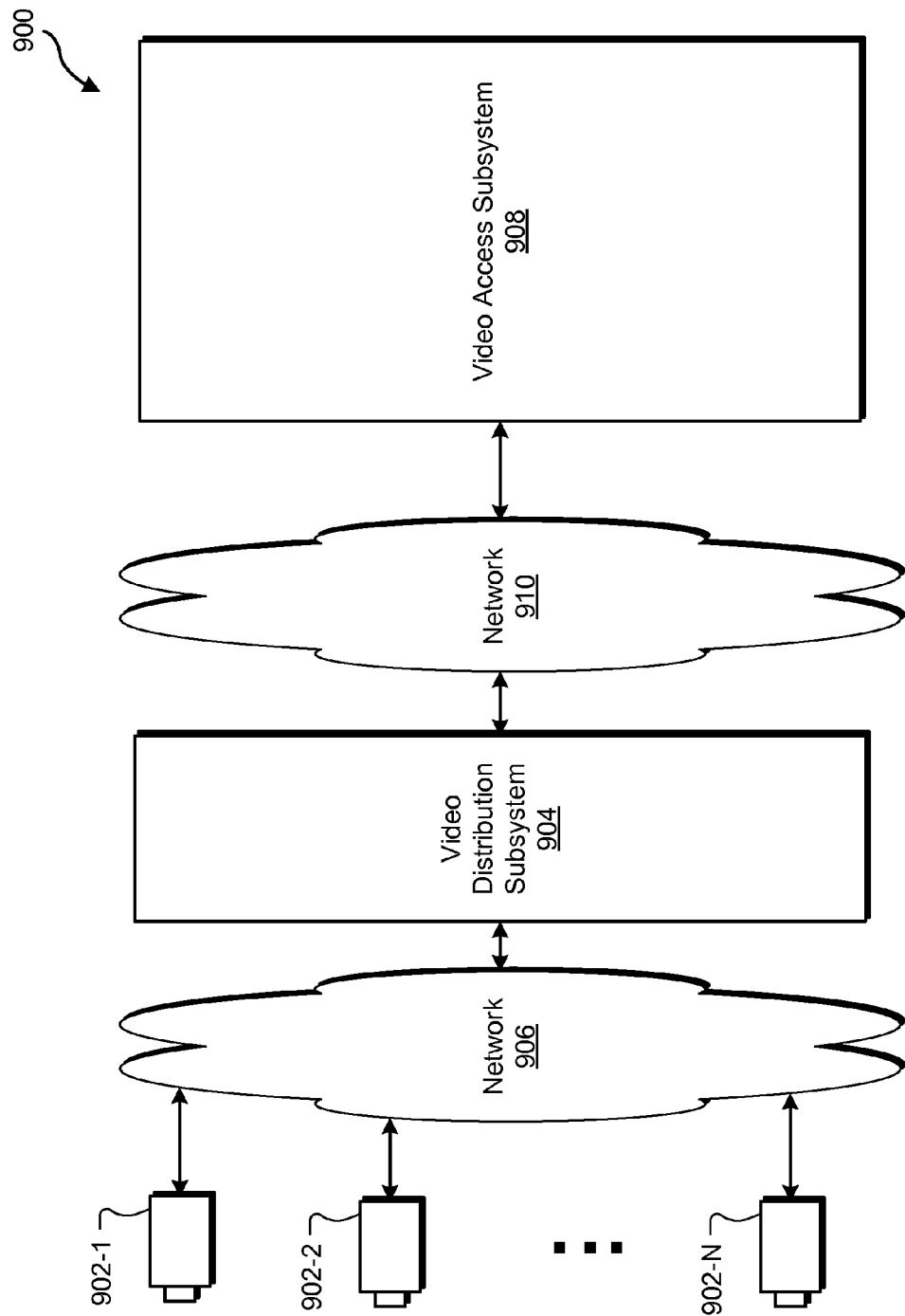
FIG. 9 illustrates an exemplary video delivery and display system according to principles described herein.

To illustrate, FIG. 9 shows an exemplary video delivery and display system 900 (or simply "system 900"). System 900 may include a plurality of video camera subsystems 902 (e.g., video camera subsystems 902-1 through 902-N) communicatively coupled to a video distribution subsystem 904 by way of network 906, as well as a video access subsystem 908 communicatively coupled to video distribution subsystem 904 by way of network 910.

Video distribution subsystem 904 may communicate with video camera subsystems 902 and video access subsystem 908 by way of networks 906 and 910, respectively, using any suitable communication technologies, devices, networks, media, and protocols supportive of remote data communications, including any of those supportive of transporting data representative of video content. Examples of such communication technologies, devices, media, formats, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, H.323 technologies, H.264/MPEG-4 technologies, Flash video technologies, Windows Media Video ("WMV") technologies, wireless communication technologies (e.g., Bluetooth, Wi-Fi, etc.), optical transport and signaling technologies, live transmission technologies (e.g., media streaming technologies), in-band and out-of-band signaling technologies, and other suitable communications technologies.

Networks 906 and 910 may include a single network, separate networks, or a combination of networks capable of carrying communications, video content, and/or data signals between video distribution subsystem 904, video camera subsystems 902, and video access subsystem 908. For example, networks 906 and 910 may include, without limitation, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying video content, data, and/or communications signals between video distribution subsystem 904, video camera subsystems 902, and video access subsystem 908. Communications between video camera subsystems 902, video distribution subsystem 904, and video access subsystem 908 may be transported using any one of the above-listed networks, or any combination or sub-combination of the above-listed networks.

Video camera subsystems 902 may be configured to capture video content representative of various scenes or views (e.g., panoramic scenes or views) at various geographic locations. For example, each of the video camera subsystems 902 may be configured to capture live video image content representative of a different camera view. In certain embodiments, each of the video camera subsystems 902 may be located at a different geographic location so as to capture a different scene or view. For example, video camera subsystem 902-1 may be located at a first geographic location and configured to capture a first scene (e.g., the Boston harbor and skyline), video camera subsystem 902-2 may be located at a second geographic location and configured to capture a second scene (e.g., the Golden Gate Bridge), and video camera subsystem 902-N may be located at an $N^{th}$ geographic location and configured to capture an $N^{th}$ scene (e.g., the Eiffel Tower). Other video camera subsystems 902 may be located at other remote geographic locations and configured to capture other scenes (e.g., a beach, zoo, stadium, etc.).

In certain examples, video image content captured by video camera subsystems 902 may include end-user-generated content. That is, end users may own and/or operate video camera subsystems 902 to capture video image content to be provided to video distribution subsystem 904 for distribution to video access subsystem 908. For example, an end user residing at a particular geographic location may establish a video camera subsystem 902 configured to capture live video image content of a scene or view at the geographic location and to provide data representative of the live video image content to video distribution subsystem 904.

To this end, video camera subsystems 902 may be configured to receive communications from and send communications to video distribution subsystem 904 such that video content captured by video camera subsystems 902 may be transmitted (e.g., uploaded) to video distribution subsystem 904 by way of network 906. In certain embodiments, video camera subsystems 902 may transmit real-time video feeds carrying live video image content to video distribution subsystem 904 by way of network 906. Video camera subsystems 902 may include any number of devices (e.g., one or more wide-angle video cameras) for capturing and publishing video content to video distribution subsystem 904.

Video distribution subsystem 904 may be configured to receive data representative of captured video content from one or more video camera subsystems 902. For example, video distribution subsystem 904 may be configured to receive one or more incoming video feeds transmitted by video camera subsystems 902.

Video distribution subsystem 904 may be further configured to distribute data representative of video content received from video camera subsystems 902 to video access subsystem 908 by way of network 910. Data representative of the video content may be transmitted to video access subsystem 908 by way of network 910 in any suitable way. In certain examples, video distribution subsystem 904 may transmit one or more outgoing real-time video feeds carrying the video content to video access subsystem 908.

Video distribution subsystem 904 may include or be implemented by one or more computing devices (e.g., one or more server devices) configured to receive video content from video camera subsystems 902 and distribute the video content to video access subsystem 908. In certain embodiments, video distribution subsystem 904 may include a set of one or more server devices located at a video head-end office ("VHO").

Video access subsystem 908 may be configured to receive data representative of video content transmitted by video distribution subsystem 904 to video access subsystem 908 by way of network 910. For example, video access subsystem 908 may receive one or more outgoing real-time video feeds carrying the data and transmitted by video distribution subsystem 904.

Figure 10:
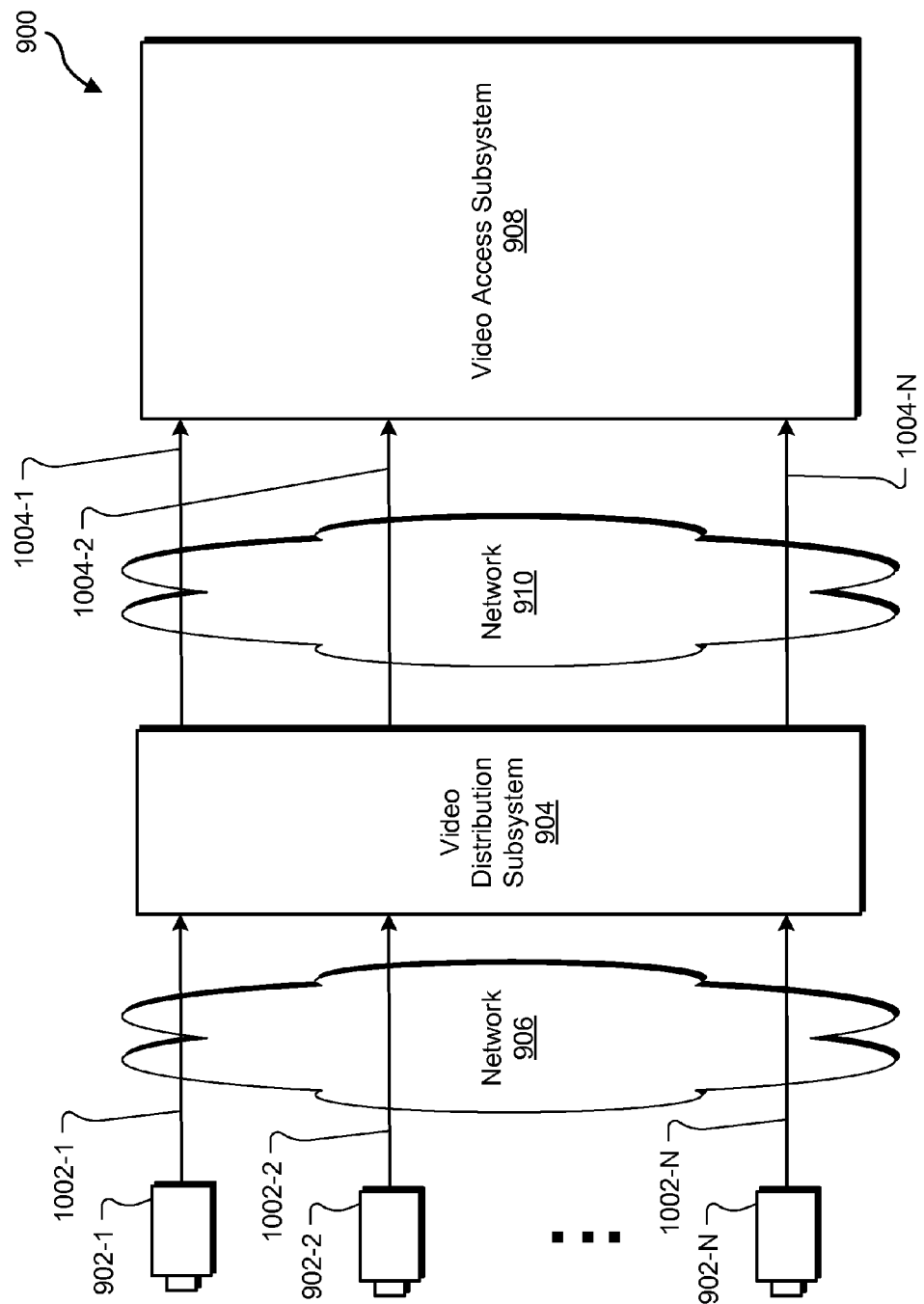
FIG. 10 illustrates exemplary delivery of multiple video feeds to a video access subsystem included in the video delivery and display system of FIG. 9 according to principles described herein.

In certain examples, video access subsystem 908 may be configured to select, from the video content made available by video distribution subsystem 904, which video content to receive and process (e.g., by tuning to the video content to receive and process). The content selection may be performed in any suitable way. As an example, video access subsystem 908 may be configured to receive multiple real-time video feeds from video distribution subsystem 904 and to select one of the video feeds for processing. FIG. 10 illustrates an exemplary delivery of multiple real-time video feeds to video access subsystem 908. As shown in FIG. 10, video distribution subsystem 904 may receive multiple incoming real-time video feeds 1002 (e.g., incoming video feeds 1002-1 through 1002-N) from video camera subsystems 902 and may transmit multiple outgoing real-time video feeds 1004 (e.g., outgoing video feeds 1004-1 through 1004-N) corresponding to the incoming real-time video feeds 1002 to video access subsystem 908. Video access subsystem 908 may select which of the received video feeds 1004 to process in any suitable way. For example, each video feed received by video access subsystem 908 may be associated with a media content carrier channel (e.g., a range of frequencies), and video access subsystem 908 may tune to a particular channel to receive and process the video feed associated with the channel.

Figure 11:
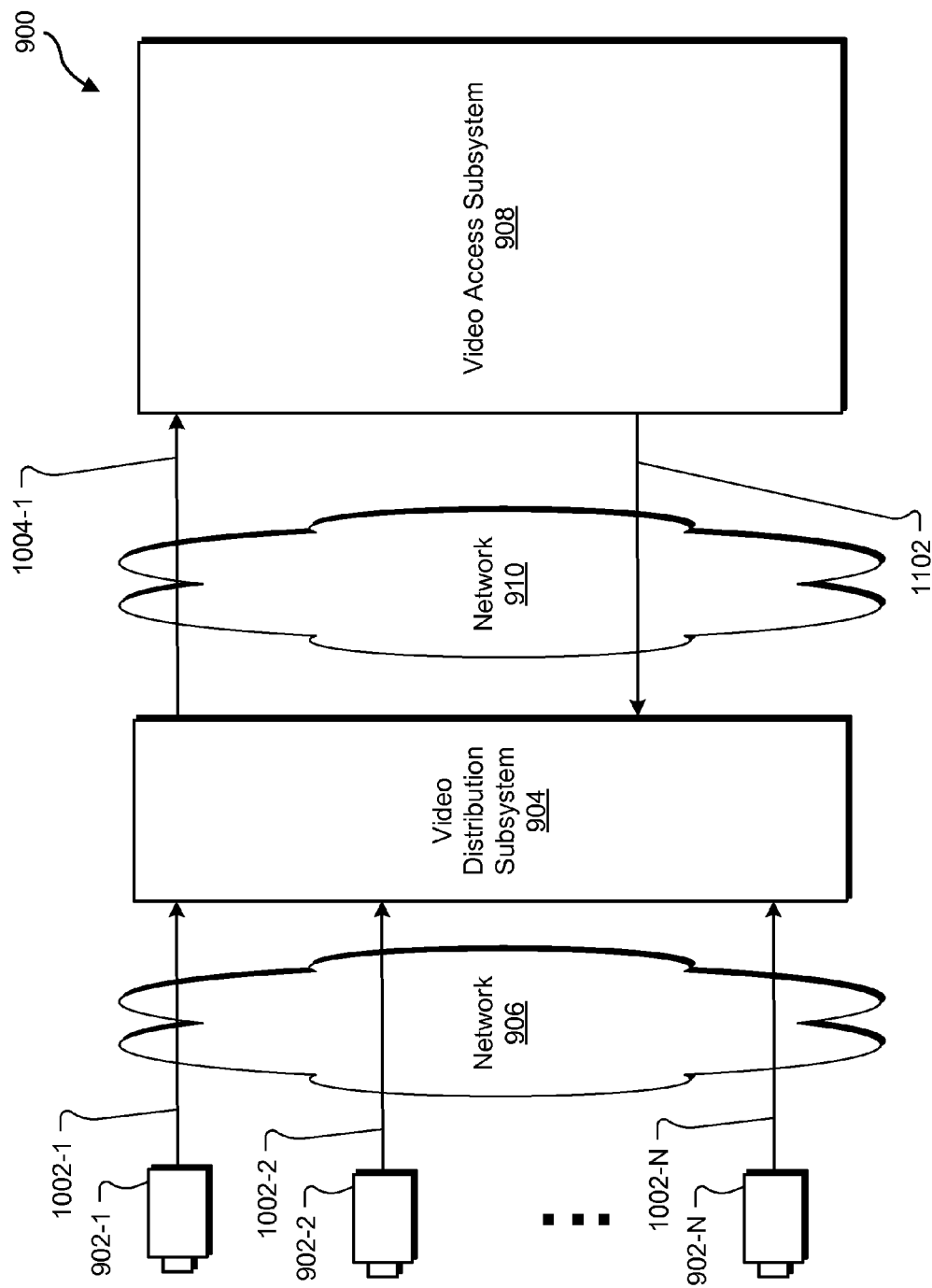
FIG. 11 illustrates an exemplary delivery of a select video feed to a video access subsystem included in the video delivery and display system of FIG. 9 according to principles described herein.

As another example, video access subsystem 908 may be configured to select and receive a single real-time video feed from video distribution subsystem 904. FIG. 11 illustrates an exemplary delivery of a single real-time video feed from video distribution subsystem 904 to video access subsystem 908. As shown in FIG. 11, video distribution subsystem 904 may receive multiple incoming real-time video feeds 1002 (e.g., incoming video feeds 1002-1 through 1002-N) from video camera subsystems 902 and may transmit a single outgoing real-time video feed 1004-1 corresponding to incoming video feed 1002-1 to video access subsystem 908. Video access subsystem 908 may receive and process video feed 1004-1.

Video distribution subsystem 904 may be configured to select which of the incoming video feeds 1002 to distribute to video access subsystem 908 in any suitable way. In certain embodiments, for example, video distribution subsystem 904 may receive a selection message 1102 from video access subsystem 908. Selection message 1102 may indicate which of the incoming video feeds 1002 is requested by video access subsystem 910. Video distribution subsystem 904 may respond to selection message 1102 by selecting from the incoming video feeds 1002 which video feed 1004-1 is to be transmitted to video access subsystem 908. Video distribution subsystem 904 may select which of the received video feeds 1002 to distribute in any suitable way. For example, each video feed received by video distribution subsystem 904 may be associated with a media content carrier channel (e.g., a range of frequencies), and video distribution subsystem 904 may tune to a particular channel to receive and distribute the video feed associated with the channel.

Video access subsystem 908 may be configured to provide a user with one or more tools for selecting video content to be processed and displayed by video access subsystem 908. For example, video access subsystem 908 may provide a graphical user interface that indicates video content that is available for selection (e.g., video content that is received by video distribution subsystem 904 from video camera subsystems 902). In some examples, the graphical user interface may indicate the scenes, views, and/or geographic locations associated with the video content so that a user may select any available scene to be processed for display by video access subsystem 908. For instance, a user may select to view live video content of the Eiffel Tower on a display screen configured to function as a virtual window.

Video access subsystem 908 may receive and process a video feed transmitted by video distribution subsystem 904. In certain examples, the processing may include displaying video image content included in the video feed on a display screen. Video access subsystem 908 may be configured to employ one or more components and/or functions of perspective display system 100. Accordingly, video access subsystem 908 may be configured to dynamically display viewable regions of video image content based on a position of a user within a user space associated with the display screen.

Figure 12:
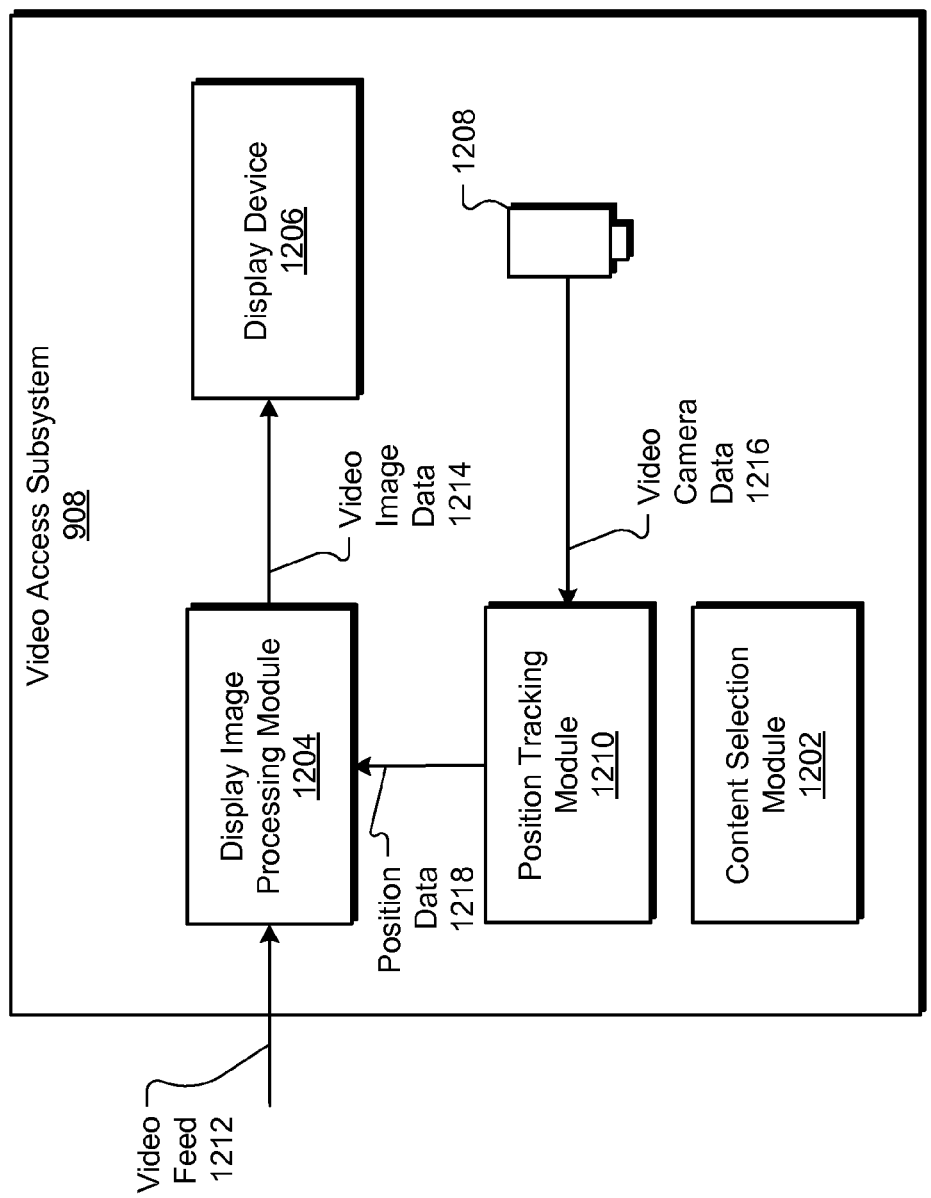
FIG. 12 illustrates exemplary components of the video access subsystem included in the video delivery and display system of FIG. 9 according to principles described herein.

To illustrate, FIG. 12 shows exemplary components of video access subsystem 908. As shown, video access subsystem 908 may include a content selection module 1202, a display image processing module 1204, a display device 1206, a video camera 1208, and a position tracking module 1210, which may be configured to communicate with one another using any suitable communication technologies. Each of the components of video access subsystem 908 will now be described in detail.

Content selection module 1202 may be configured to select content to be processed by video access device 908. Content selection module 1202 may select content in any suitable way, including by tuning to an incoming video feed and/or by sending a content request message to video distribution subsystem 904 to request that certain content be transmitted to video access subsystem 908. In certain examples, content selection module 1202 may be configured to select content to be processed by video access device 908 in response to and/or based on one or more predefined gestures performed by a user and detected by video camera 1208. To this end, video access subsystem 908 may further include a gesture recognition module (not shown) communicatively coupled to video camera 1208 and content selection module 1202. The gesture recognition module may be configured to analyze video camera data 1216 received from video camera 1208 to identify one or more predefined gestures performed by a user.

Content received from video distribution subsystem 904 may be processed by display image processing module 1204 for display by display device 1206. For example, display image processing module 1204 may process a video feed 1212 received by video access subsystem 908 from video distribution subsystem 904 and carrying video content to generate video image data 1214 that is output to display device 1206 for display on a display screen. Display device 1206 may receive video image data 1214 from display image processing module 1204 and display one or more video images represented by the data on a display screen.

Display image processing module 1204 may be configured to selectively process video content for display in accordance with either a normal display mode or a perspective display mode. When the perspective display mode is not active, display image processing module 1204 may process video content in accordance with the normal display mode, which may facilitate a display of an entire video image on a display screen. For example, when the perspective display mode is not active, display image processing module 1204 may receive and process video feed 1212 carrying data representative of a video image to generate and output video image data 1214 that represents and is configured to facilitate a display of the entire video image (e.g., the entire video frame image) on a display screen. To illustrate, if the video feed carries data representative of a panoramic view captured by video camera subsystem 902-1, the entire panoramic view may be displayed on the display screen when display image processing module 1204 operates in the normal display mode.

When the perspective display mode is active, display image processing module 1204 may receive and process video feed 1212 carrying data representative of a video image to generate and output video image data 1214 that represents and is configured to facilitate a display of a select viewable region of the video image (e.g., a subset of the entire video frame image) on the display screen. This may be accomplished in any of the ways described herein. For example, video camera 1208 may capture video camera data 1216 representative of a camera view of a user space associated with a display screen of display device 1206. Video camera 1208 may provide the video camera data 1216 to position tracking module 1210, which may utilize the video camera data 1216 to determine a position of a user within the user space. The determination may be made in any of the ways described herein. Position tracking module 1210 may provide position data 1218 indicating the position of the user to display image processing module 1204, which may use the position data 1218 to identify a viewable region of the video image carried by video feed 1212 and to generate and provide video image data 1214 representative of only the viewable region of the video image to display device 1206 for display on the display screen to facilitate a user perception of a perspective view of the video image.

In this or a similar manner, video access subsystem 908 may be configured to display a perspective view of a video image, such as a dynamic perspective view of a live video image of a panoramic scene that is received by video access subsystem 908 in a real-time or non-real-time video feed distributed by video distribution subsystem 904. Accordingly, a user of video access subsystem 908 may be able to enjoy a virtual window experience in which a perspective view of a video image (e.g., a panoramic video image) is dynamically displayed and updated on a display screen based on a position and movement of the user within a physical user space associated with the display screen.

In addition or as an alternative to providing a perspective view of an image as described above, in certain embodiments, one or more video camera subsystems 902 may be remotely controllable by video access subsystem 908. The remote control of video camera subsystem 902 may be used to generate and/or augment the providing of a perspective view of an image. For example, based on a determined user position within a physical user space, video access subsystem 908 may send one or more commands to a video camera subsystem such as video camera subsystem 902-1 to direct the video camera subsystem to adjust video camera settings such as by physically zooming, panning, and/or tilting the remote video camera based on the user position. Such remote control of the video camera subsystem may be useful when the image captured by the video camera subsystem is fed to only a single video access subsystem 908.

In certain examples, source video content may include three-dimensional video content, and video access subsystem 908 may be configured with three-dimensional display technologies for displaying the three-dimensional video content to produce a three-dimensional virtual window viewing experience for a user of video access subsystem 908.

In certain embodiments, video delivery and display system 100 may be further configured to initiate and/or track compensation of user-generated-content producers associated with video camera subsystems 902. The compensation (e.g., a microcredit) may be determined in any suitable way, such as based on the access to and/or usage of the video content by one or more end user viewers through video access subsystems.

Figure 13:
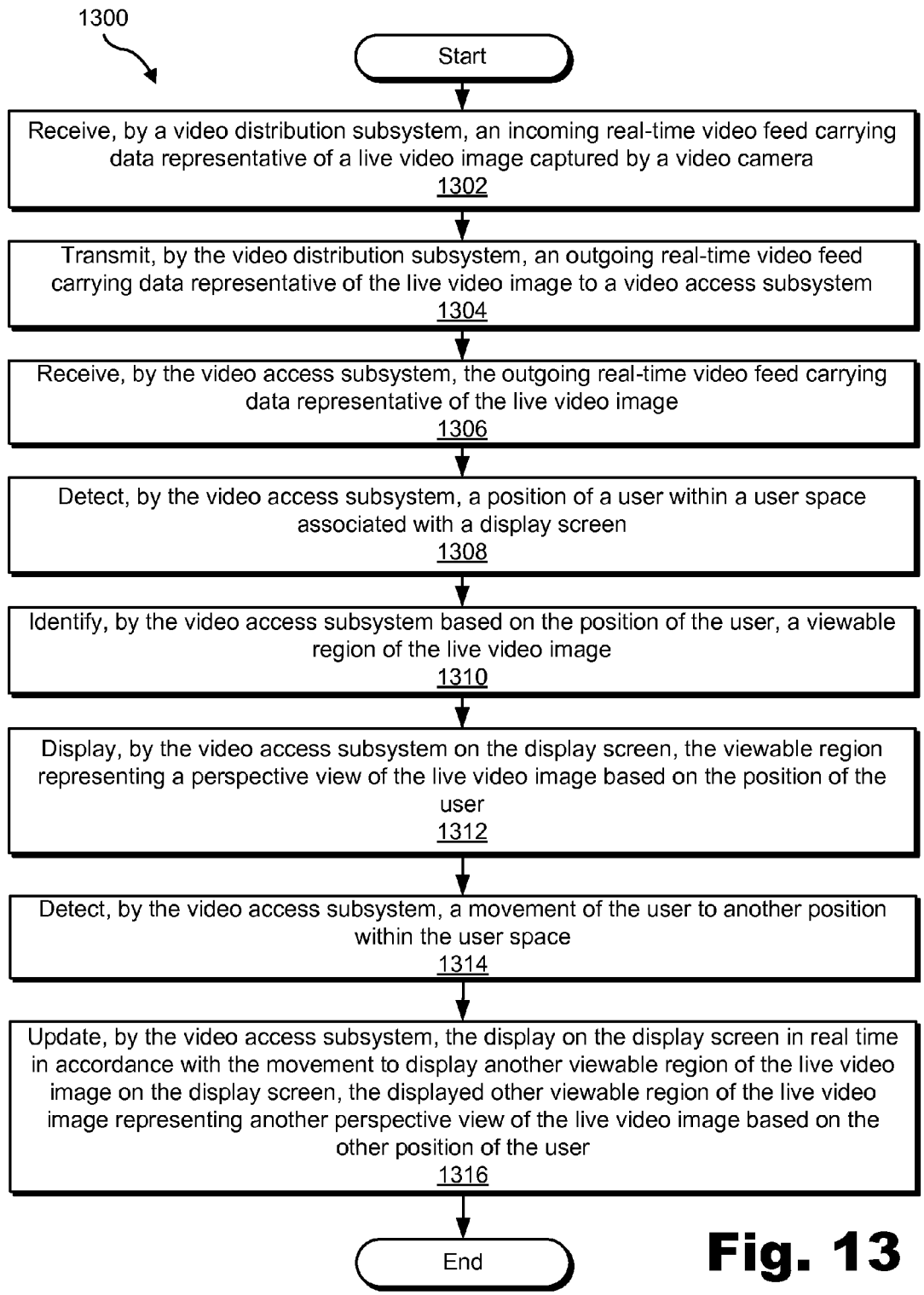
FIG. 13 illustrates an exemplary video delivery and display method according to principles described herein.

FIG. 13 illustrates an exemplary video delivery and display method according to principles described herein. While FIG. 13 illustrates exemplary steps according to one embodiment, other embodiments may omit, add to, reorder, combine, and/or modify any of the steps shown in FIG. 13. In certain embodiments, one or more of the steps shown in FIG. 13 may be performed by one or more components of system 900.

In step 1302, an incoming real-time video feed carrying data representative of a live video image captured by a video camera may be received by a video distribution subsystem. Step 1302 may be performed in any of the ways described herein, including by video distribution subsystem 904 receiving the incoming real-time video feed from one of video camera subsystems 902.

In step 1304, an outgoing real-time video feed carrying data representative of the live video image may be transmitted by the video distribution subsystem to a video access subsystem. Step 1304 may be performed in any of the ways described herein. For example, video distribution subsystem 904 may transmit the outgoing real-time video feed to video access subsystem 908 automatically or in response to a request received from video access subsystem 908 for the live video image carried in the real-time video feed.

In step 1306, the outgoing real-time video feed carrying data representative of the live video image may be received by the video access subsystem. Step 1306 may be performed in any of the ways described herein, including by video access subsystem 908 receiving the outgoing real-time video feed from video distribution subsystem 904.

In step 1308, a position of a user within a user space associated with a display screen may be detected by the video access subsystem. Step 1308 may be performed in any of the ways described herein.

In step 1310, a viewable region of the live video image may be identified by the video access subsystem based on the position of the user. Step 1310 may be performed in any of the ways described herein.

In step 1312, the viewable region of the live video image identified in step 1310 may be displayed on the display screen by the video access subsystem. As described above, the displayed viewable region of the live video image may represent a perspective view of the live video image based on the position of the user.

In step 1314, a movement of the user to another position within the user space may be detected by the video access subsystem. Step 1314 may be performed in any of the ways described herein.

In step 1316, the display on the display screen may be updated by the video access subsystem in real-time in accordance with the movement of the user detected in step 1314 to display another viewable region of the live video image on the display screen. As described above, the other viewable region of the live video image displayed on the display screen may represent another perspective view of the live video image based on the other position of the user.

Figure 14:
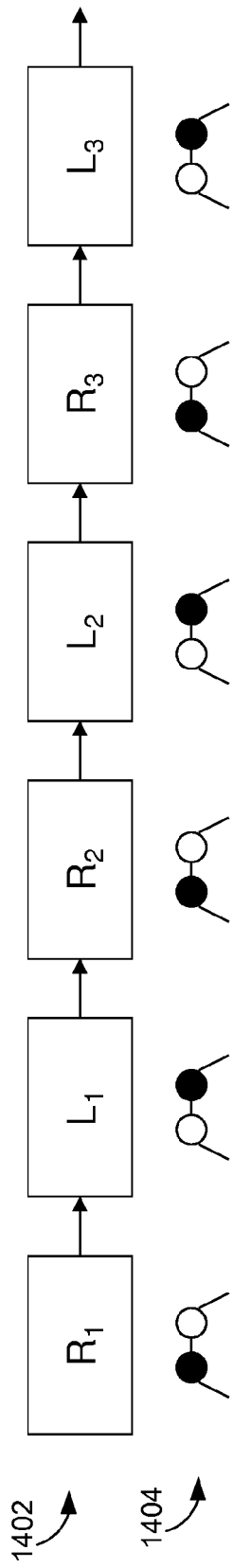
FIG. 14 illustrates an example of alternating between exposing left and right eye views of active shutter glasses synchronized with an alternating between displaying left and right views on a display.

As mentioned above, in certain embodiments, perspective display system 100 may be configured to concurrently track the positions of multiple users within the physical user space and provide multiple different perspective views of an image on a display screen. For example, each user may be concurrently presented with a different perspective view on an image. In certain examples, concurrent presentation of difference perspective views of an image may be provided by perspective display system 100 leveraging active shuttering technologies that are used to produce a three-dimensional effect for a user viewing media content. In active shuttering, the user wears active shutter glasses that alternate between exposing left and right eye views. The alternating of the lens of the glasses is synchronized with alternating left and right source media source views on a display to create a perception of depth for the user wearing the glasses and viewing the display. This produces a three-dimensional viewing effect. FIG. 14 illustrates an example of alternating between exposing left and right eye views of active shutter glasses 1402 (by alternately opening and closing the lenses of the active shutter glasses) synchronized with an alternating between displaying left and right views on a display 1404.

In a multi-user perspective view display configuration, rather than using the active shutter glasses to create separate left and right eye views for a single user, active shutter glasses may be used to present different perspective views of an image to different users. For example, active shutter glasses worn by a first user may be synchronized with a display of a first viewable region of an image on a display screen such that the first user sees the first viewable region of the image that is identified based on the given position of the first user relative to the display screen, as described above. Concurrently, active shutter glasses worn by a second user may be synchronized with a display of a second, different viewable region of the image on the display screen such that the second user sees the second viewable region of the image that is identified based on the given, different position of the second user relative to the display screen, as described above. When the lenses of the first user's glasses are blocked ("dark"), the lenses of the second user's glasses may be open and synchronized with the display of the second viewable region of the image. When the lenses of the second user's glasses are blocked, the lenses of the first user's glasses may be open and synchronized with the display of the first viewable region of the image. Accordingly, each of the user's may concurrently view a different viewable region of the image that is identified based on the position of each user relative to the display screen.

Figure 15:
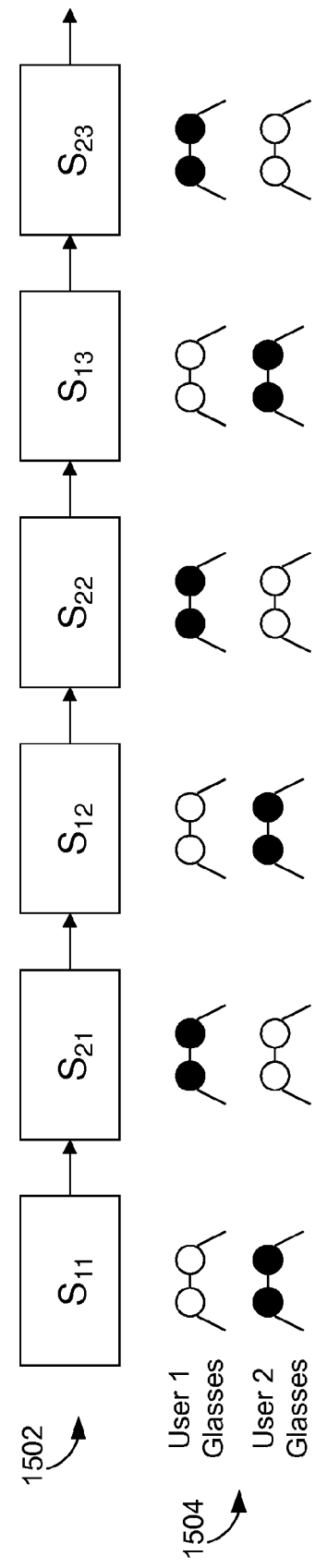
FIG. 15 illustrates an example of alternating between opening the lenses of a first pair of active shutter glasses and opening the lenses of a second pair of active shutter glasses synchronized with an alternating between displaying first and second viewable regions of an image on a display.

To further illustrate, FIG. 15 shows an example of alternating between opening the lenses of a first pair of active shutter glasses and opening the lenses of a second pair of active shutter glasses 1502 synchronized with an alternating between displaying first and second viewable regions of an image on a display 1504. As shown, the lenses of the active shutter glasses associated with a first user ("User 1") may be open when scenes (scenes $S_{11}$, $S_{12}$, and $S_{13}$) associated a first viewable region of an image are displayed, and the lenses of the active shutter glasses associated with a second user ("User 2") may be open when scenes (scenes $S_{21}$, $S_{22}$, and $S_{23}$) associated a second viewable region of an image are displayed. As a result, the first and second users may concurrently view different perspective views of an image.

The alternating between closing and opening of the lenses in the active shutter glasses and the alternating between displaying first and second viewable regions of an image may be performed at a frequency that is imperceptible to a user. Accordingly, a display screen may be able to present different views to different users. While the example shown in FIG. 15 is directed to presentation of two different perspective views to two different users, the example is extensible to more than two users subject to a corresponding degradation to the refresh rate experienced by each of the users.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
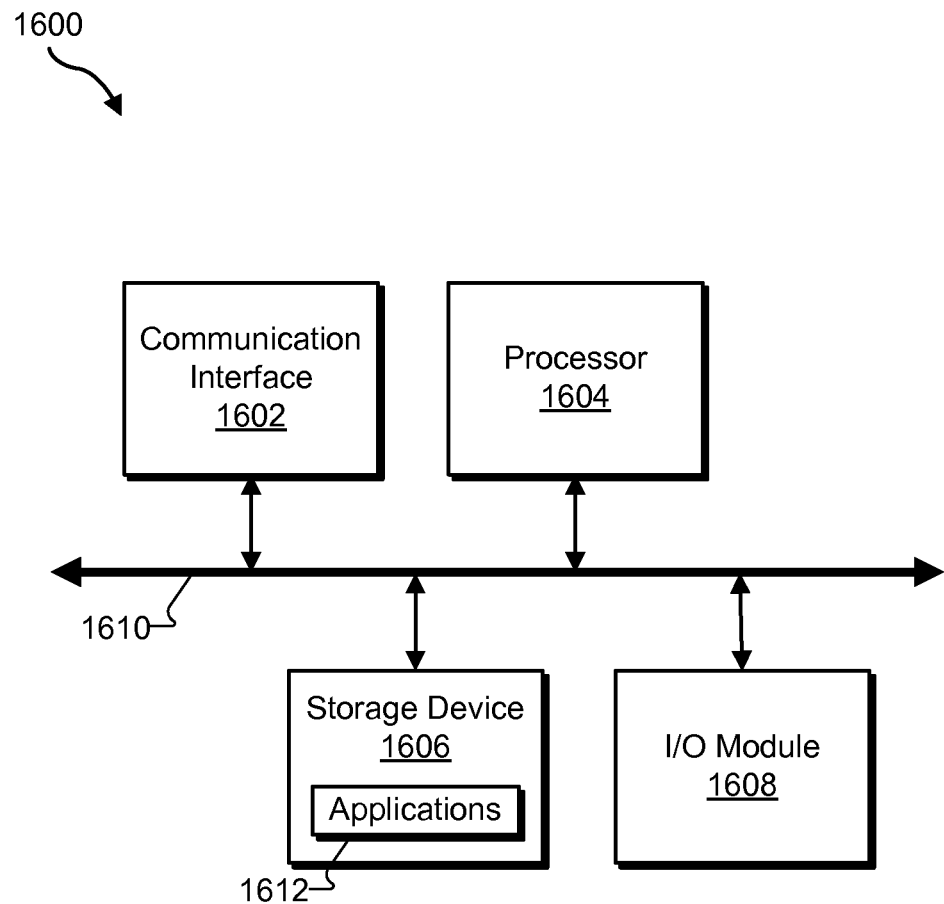
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, and any other suitable interface. In at least one embodiment, communication interface 1602 may provide a direct connection between system 100 and one or more of provisioning systems via a direct link to a network, such as the Internet. Communication interface 1602 may additionally or alternatively provide such a connection through, for example, a local area network (such as an Ethernet network), a personal area network, a telephone or cable network, a satellite data connection, a dedicated URL, or any other suitable connection. Communication interface 1602 may be configured to interface with any suitable communication media, protocols, and formats, including any of those mentioned above.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), a spatial input interface, a remote gesture interface, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the systems, facilities, modules, and/or devices described herein may be implemented by or within one or more components of computing device 1400. For example, one or more applications 1412 residing within storage device 1406 may be configured to direct processor 1404 to perform one or more processes or functions associated with method 800, method 1300, and/or one or more components of system 100 and/or system 900.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   calibrating, by a perspective display system, a geometric model of an image array, a virtual aperture defined by a single display screen of a single display device, and a user space associated with the single display screen of the single display device, the calibrating comprising virtually positioning the image array at a constant distance behind the virtual aperture based on a predefined distance from the single display screen at which the entire image array is to be viewable, from the user space, through the virtual aperture defined by the single display screen of the single display device;
   acquiring, by a perspective display system, visual data representative of a camera view of the user space associated with the single display screen of the single display device;
   determining, by the perspective display system based on the visual data, a position of a first user within the user space and a position of a second user within the user space, wherein
      the determining of the position of the first user comprises:
         detecting a predefined tracking initiation gesture performed by the first user; and
         locking onto and tracking, based on the predefined tracking initiation gesture, a physical feature of the first user within the user space during a first time period; and
      the determining of the position of the second user comprises:
         detecting an additional predefined tracking initiation gesture performed by the second user; and
         locking onto and tracking, based on the additional predefined tracking initiation gesture, a physical feature of the second user within the user space during a second time period, the second time period different from the first time period;
   receiving, by the perspective display system, a request to view one of a plurality of channels that provide user-selected content to the first user and the second user via the perspective display system, the one of the plurality of channels including at least one image;
   identifying, by the perspective display system based on a relationship between the position of the first user, the virtual aperture defined by the single display screen of the single display device, and the at least one image represented by the image array positioned at the constant virtual distance behind the virtual aperture in accordance with the calibrated geometric model, a first viewable region of the at least one image;
   identifying, by the perspective display system based on a relationship between the position of the second user, the virtual aperture defined by the single display screen of the single display device, and the at least one image represented by the image array positioned at the constant virtual distance behind the virtual aperture in accordance with the calibrated geometric model, a second viewable region of the at least one image;

generating, by the perspective display system, one of a display of the first viewable region of the at least one image and a display of the second viewable region of the at least one image; and displaying, by the perspective display system, the one of the generated display of the first viewable region of the at least one image and the generated display of the second viewable region of the at least one image on the single display screen of the single display device, the first viewable region of the at least one image representing a first perspective view of the at least one image based on the relationship between the position of the first user and the virtual aperture defined by the single display screen of the single display device, and the second viewable region of the at least one image representing a second perspective view of the at least one image based on the relationship between the position of the second user and the virtual aperture defined by the single display screen of the single display device.

2. The method of claim 1, further comprising:

detecting, by the perspective display system while locked onto and tracking the physical feature of the first user, a movement of the first user to another position within the user space; and updating, by the perspective display system, the display on the single display screen of the single display device in real time in accordance with the movement to display another viewable region of the at least one image on the single display screen of the single display device, the another viewable region of the at least one image representing another perspective view of the at least one image based on the another position of the first user.

3. The method of claim 2, wherein the updating comprises displaying at least one of a panning, a tilting, and a zooming from the first viewable region of the at least one image to the another viewable region of the at least one image on the single display screen of the single display device.

4. The method of claim 1, wherein the at least one image comprises a real-time live video image.

5. The method of claim 4, further comprising receiving, by the perspective display system in real time, a video feed carrying the real-time live video image, wherein the real-time live video image comprises end-user-generated content captured by at least one video camera.

6. The method of claim 4, wherein the real-time live video image comprises a panoramic video image.

7. The method of claim 4, wherein the real-time live video image comprises a three-dimensional real-time live video image.

8. The method of claim 1, wherein the physical feature of the first user comprises at least one eye of the first user.

9. The method of claim 1, wherein the determining of the position of the first user further comprises determining three-dimensional coordinates of the physical feature of the first user within the user space based on the visual data.

10. The method of claim 1, wherein the identifying of the first viewable region of the at least one image based on the relationship between the position of the first user, the virtual aperture defined by the single display screen of the single display device, and the at least one image represented by the image array positioned at the constant virtual distance behind the virtual aperture in accordance with the calibrated geometric model is further based on a congruence of triangles in the geometric model.

11. The method of claim 1, wherein the determining of the position of the first user is performed without the first user utilizing a user input device within the user space.

12. The method of claim 1, embodied as computer-executable instructions on at least one non-transitory computer-readable medium.

13. The method of claim 1, wherein the first viewable region of the at least one image is a sub-region of the at least one image.

14. The method of claim 2, wherein the first viewable region is a sub-region of the at least one image and the another viewable region is a different sub-region of the at least one image.

15. A method comprising:

receiving, by a video distribution subsystem, a plurality of incoming real-time video feeds carrying data representative of a plurality of live video images captured by a plurality of video cameras;

receiving, by the video distribution subsystem, a request to view a user-selected outgoing real-time video feed among a plurality of outgoing real-time video feeds on one of a plurality of channels carrying data representative of one of the plurality of the live video images;

transmitting, by the video distribution subsystem, the user-selected outgoing real-time video feed carrying data representative of the one of the plurality of live video images to a video access subsystem;

receiving, by the video access subsystem, the user-selected outgoing real-time video feed carrying data representative of the one of the plurality of live video images;

calibrating, by the video access subsystem, a geometric model of an image array, a virtual aperture defined by a single display screen of a single display device, and a user space associated with the single display screen of the single display device, the calibrating comprising virtually positioning the image array at a constant distance behind the virtual aperture based on a predefined distance from the single display screen at which the entire image array is to be viewable, from the user space, through the virtual aperture defined by the single display screen of the single display device;

detecting, by the video access subsystem, a position of a first user within the user space associated with the single display screen of the single display device and a position of a second user within the user space associated with the single display screen of the single display device, wherein the detecting of the position of the first user comprises:
  detecting a predefined tracking initiation gesture performed by the first user; and
  locking onto and tracking, based on the predefined tracking initiation gesture, a physical feature of the first user within the user space during a first time period; and the detecting of the position of the second user comprises:
  detecting an additional predefined tracking initiation gesture performed by the second user; and
  locking onto and tracking, based on the additional predefined tracking initiation gesture, a physical feature of the second user within the user space during a second time period, the second time period different from the first time period;

identifying, by the video access subsystem based on a relationship between the position of the first user, the virtual aperture defined by the single display screen of the single display device, and the one of the plurality of live video images represented by the image array positioned at the constant virtual distance behind the virtual aperture in accordance with the calibrated geometric model, a first viewable region of the one of the plurality of live video images;

identifying, by the video access subsystem based on a relationship between the position of the second user, the virtual aperture defined by the single display screen of the single display device, and the one of the plurality of live video images represented by the image array positioned at the constant virtual distance behind the virtual aperture in accordance with the calibrated geometric model, a second viewable region of the one of the plurality of live video images;

generating, by the video access subsystem, one of a display of the first viewable region of the one of the plurality of live video images and a display of the second viewable region of the one of the plurality of live video images; and displaying, by the video access subsystem on the single display screen of the single display device, the one of the generated display of the first viewable region of the one of the plurality of live video images and the generated display of the second viewable region of the one of the plurality of live video images on the single display screen of the single display device, the first viewable region of the one of the plurality of live video images representing a first perspective view of the one of the plurality of live video images based on the relationship between the position of the first user and the virtual aperture defined by the single display screen of the single display device, and the second viewable region of the one of the plurality of live video images representing a second perspective view of the one of the plurality of live video images based on the relationship between the position of the second user and the virtual aperture defined by the single display screen of the single display device.

16. The method of claim 15, further comprising:

detecting, by the video access subsystem while locked onto and tracking the physical feature of the first user, a movement of the first user to another position within the user space; and updating, by the video access subsystem, the display on the single display screen of the single display device in real time in accordance with the movement to display another viewable region of the one of the plurality of live video images on the single display screen of the single display device, the another viewable region of the one of the plurality of live video images representing another perspective view of the one of the plurality of live video images based on the another position.

17. The method of claim 15, wherein the one of the plurality of live video images comprises end-user-generated content captured and provided to the video distribution subsystem in real time.

18. The method of claim 15, wherein the one of the plurality of live video images comprises a live panoramic video image.

19. The method of claim 15, wherein the one of the plurality of live video images comprises a live three-dimensional video image.

20. The method of claim 15, embodied as computer-executable instructions on at least one non-transitory computer-readable medium.

21. A system comprising:

a video distribution subsystem that
  receives a plurality of incoming real-time video feeds carrying data representative of one of a plurality of a live video image captured by a plurality of video cameras,
  receives a request to view a user-selected outgoing real-time video feed among a plurality of outgoing real-time video feeds on one of a plurality of channels carrying data representative of one of the plurality of live video images, and
  distributes the user-selected outgoing real-time video feed carrying data representative of the one of the plurality of live video images over a network; and a video access subsystem communicatively coupled to the video distribution subsystem by way of the network and that
  receives the outgoing real-time video feed carrying data representative of one of the plurality of live video images;
  calibrates a geometric model of an image array, a virtual aperture defined by a single display screen of a single display device, and a user space associated with the single display screen of the single display device, the calibrating comprising virtually positioning the image array at a constant distance behind the virtual aperture based on a predefined distance from the single display screen at which the entire image array is to be viewable, from the user space, through the virtual aperture defined by the single display screen of the single display device;
  detects a position of a first user within the user space associated with the single display screen of the single display device and a position of a second user within the physical user space associated with the single display screen of the single display device, wherein
    the video access subsystem detects the position of the first user by:
      detecting a predefined tracking initiation gesture performed by the first user; and
      locking onto and tracking, based on the predefined tracking initiation gesture, a physical feature of the first user within the user space during a first time period; and
    the video access subsystem detects the position of the second user by:
      detecting an additional predefined tracking initiation gesture performed by the second user; and
      locking onto and tracking, based on the additional predefined tracking initiation gesture, a physical feature of the second user within the user space during a second time period, the second time period different from the first time period;
  identifies, based on a relationship between the position of the first user, the virtual aperture defined by the single display screen of the single display device, and the one of the plurality of live video images represented by the image array positioned at the constant virtual distance behind the virtual aperture in accordance with the calibrated geometric model, a first viewable region of the one of the plurality of live video images;
  identifies, based on a relationship between the position of the second user, the virtual aperture defined by the single display screen of the single display device, and the one of the plurality of live video images represented by the image array positioned at the constant virtual distance behind the virtual aperture in accordance with the calibrated geometric model, a second viewable region of the one of the plurality of live video images;

generates, within the single display device, one of a display of the first viewable region of the one of the plurality of live video images and a display of the second viewable region of the one of the plurality of live video images; and displays, on the single display screen of the single display device, one of a first perspective view of the generated display of the first viewable region of the one of the plurality of live video images based on the relationship between the position of the first user and the virtual aperture defined by the single display screen of the single display device and a second perspective view of the generated display of the second viewable region of the one of the plurality of live video images based on the relationship between the position of the second user and the virtual aperture defined by the single display screen of the single display device.

22. The system of claim 21, wherein the video access subsystem comprises at least one of a set-top box device, a mobile phone device, a gaming console, and a tablet computer.

23. The system of claim 21, wherein the network comprises at least one of a subscriber television network and a mobile phone network.

* * * * *